United States Patent [19]

Igarashi

[11] Patent Number: 5,099,321
[45] Date of Patent: Mar. 24, 1992

[54] MICROFILM SEARCHING AND READING DEVICE

[75] Inventor: Shunkichi Igarashi, Tokyo, Japan

[73] Assignee: Fuji Photo Film Co., Ltd., Kanagawa, Japan

[21] Appl. No.: 325,175

[22] Filed: Mar. 17, 1989

[30] Foreign Application Priority Data

Aug. 19, 1988 [JP] Japan ................................. 63-204744

[51] Int. Cl.$^5$ ............................................. H04N 5/22
[52] U.S. Cl. ...................................... 358/102; 358/487
[58] Field of Search ............... 358/102, 403, 487, 214, 358/209, 225

[56] References Cited

U.S. PATENT DOCUMENTS

| | | | |
|---|---|---|---|
| 3,523,183 | 8/1970 | Silverman | 358/102 |
| 3,697,680 | 10/1972 | Anstin | 358/102 |
| 3,833,294 | 9/1974 | Kessler . | |
| 3,881,053 | 4/1975 | Lemelson . | |
| 3,938,190 | 2/1976 | Semmlow . | |
| 4,087,839 | 5/1978 | Lemelson | 358/102 X |
| 4,271,432 | 6/1981 | O'Brien | 358/102 |
| 4,353,642 | 10/1982 | Weigert . | |
| 4,943,853 | 7/1990 | Morisawa | 358/102 |

FOREIGN PATENT DOCUMENTS 0050175 4/1982 European Pat. Off. .
0066317 12/1982 European Pat. Off. .
2115544 9/1983 United Kingdom .

Primary Examiner—Victor R. Kostak
Attorney, Agent, or Firm—Sughrue, Mion, Zinn, Macpeak & Seas

[57] ABSTRACT

A microfilm searching and reading device for selecting a microfilm cartridge containing a target image from multiple microfilm cartridges and for reading the target image to produce image signals. The device is composed of a storage rack and a scanner including an image reader and a driving unit for winding and rewinding the microfilm roll contained in the selected microfilm cartridge. According to one aspect of the invention, the scanner is moved along the vertical direction to a position aligned with the selected cartridge and then the selected cartridge is ejected from the rack to be received by the scanner. According to another aspect of the invention, the scanner is moved into the rack to receive the selected cartridge to read the target image and then retracted from the rack. According to a further aspect of the invention, the scanner includes a driving unit which has a drive shaft removably engaging with the driven shaft of the selected cartridge. The drive shaft of the scanner may be replaced by a drive roller which is to be engaged with a driven disk operatively associated with the reel of each microfilm cartridge or each support plate of the storage rack. The device further is composed of a memory mechanism for storing the positional data of respective microfilm cartridges, and a control mechanism for controlling the movement and operation of the scanner. The access time can be markedly reduced and changes in system scale can be readily accommodated.

17 Claims, 28 Drawing Sheets

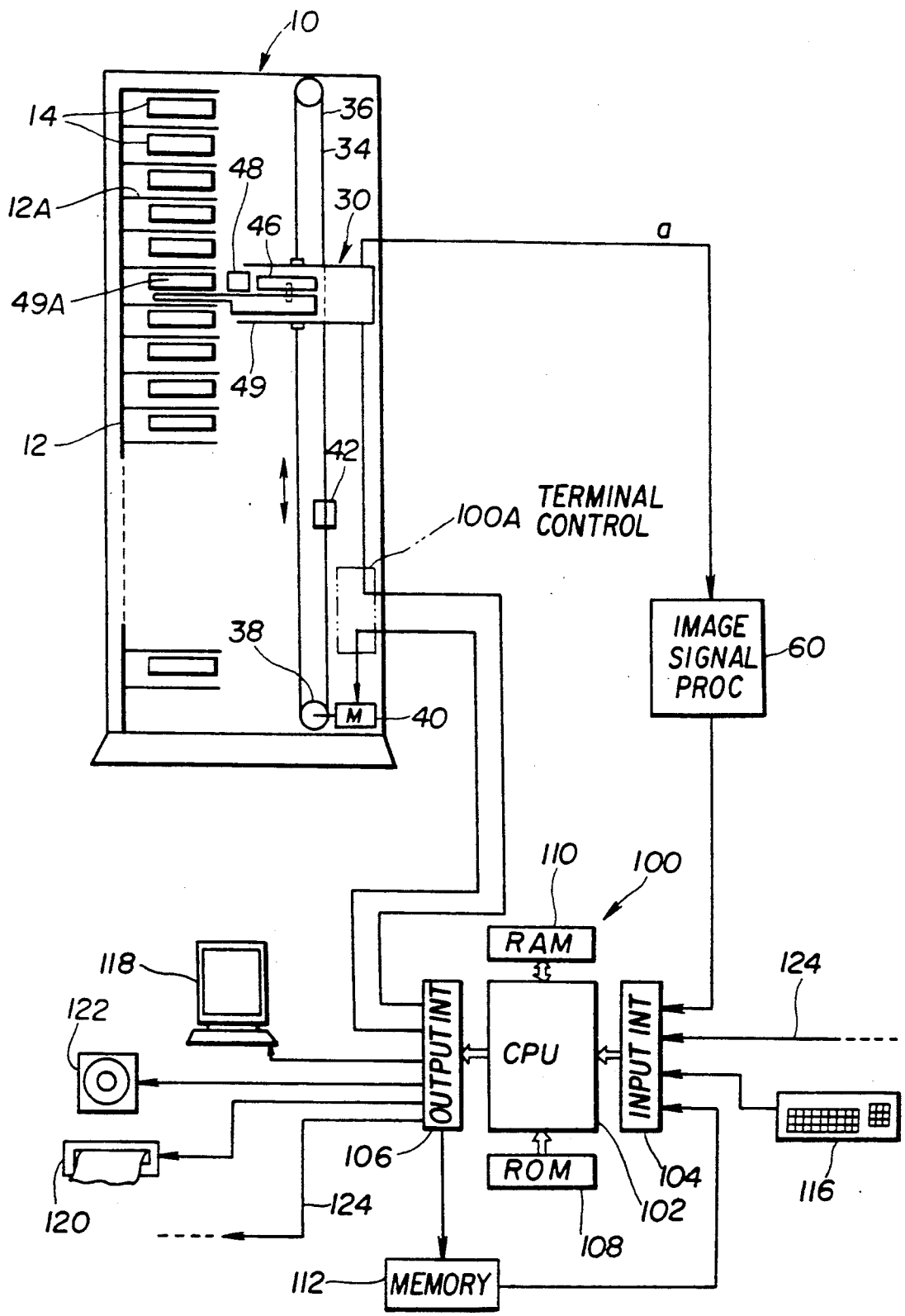

MICROFILM SEARCHING AND READING DEVICE

BACKGROUND OF THE INVENTION

1. Field of the Invention

The present invention relates to a microfilm searching and reading device for selecting a cartridge containing a target image from stored microfilm cartridges and then reading out the target image by an image sensor. The present invention further relates to a scanner which is to be assembled in the aforementioned microfilm searching and reading device.

2. Prior Art Statement

There is known an apparatus for selectively taking out a microfilm cartridge containing a target image from a multiplicity of cartridges stored in storing racks and then reading the target image so that image data are converted into digital signals. The output image data may be supplied to a display device such as cathode ray tube, a printer or a facsimile, or may be combined with outputs from other data processing units to be printed so that desired data sheets or documents are printed out. Thus, by converting the image data in microfilms into digital signals or data, it becomes possible to realize cooperation with a digital image processing device of different type directly or through a data communication network to improve the utility of the microfilm.

One of the known systems for storing and handling microfilm cartridges is a rotary rack type device, which comprises plural shelves disposed around the periphery of a rotary drum for storing thereon a number of microfilm cartridges, and take-out means arranged at a predetermined location facing to the periphery of the rotary shelves, said take-out means being movable in the vertical direction. In operation of this known rotary rack type device, the drum is rotated so that the rack containing the desired cartridge is facing to the take-out means, and then the take-out means is moved in the vertical direction to take out the desired cartridge which is transferred to an image reader having an image sensor.

However, since the relatively heavy rotary shelves must be rotated in the initial step, and then the take-out means are moved in the vertical direction in the next step, the time costed for taking out the desired cartridge, i.e. the access time, is redundantly long in addition to a large area required for the installation thereof.

Another known system comprises a fixed storing shelf having a configuration similar to a bookshelf, and a carrier arranged in front of the storing shelf to move in a plane facing and covering the entire front area of the shelf. In operation, the carrier moves two-dimensionally in the X and Y directions along the vertical plane facing the front area of the storing shelf to be positioned just before the desired cartridge which is then grasped and taken out by the carrier to be delivered to an image reader disposed at a fixed position. However, this known system has a disadvantage in that the access time is prolonged since the cartridge is first taken out from the storing shelf by the carrier and then delivered from the carrier to the image reader. Another disadvantage of this known system is that the scanner is liable to become large in size since the target image is read from a selected cartridge, and thus it becomes difficult to design a compact scanner which can be snugly contained in the storage rack. For these reason the known system requires a large space and it cannot be adapted for a small scale system.

There is also a maintenance problem. That is, when dusts or other stains stick to the optical system of image reader of the scanner contained in the storage rack, difficulty is encountered to remove such dusts or stains.

OBJECTS AND SUMMARY OF THE INVENTION

Accordingly, a primary object of this invention is to provide a microfilm searching and reading device which is small in size and capable of searching a desired microfilm cartridge and then reading a target image in the searched microfilm cartridge within a short access time.

Another object of this invention is to provide such a device which can be readily adapted for change in system scale.

A more specific object of this invention is to provide a microfilm searching and reading device in which a scanner including an image reader is moved to the position vicinal to the selected microfilm cartridge rather than moving the selected microfilm cartridge to the scanner located remote from the stored position.

A further object of this invention is to provide a microfilm searching and reading device in which a scanner including an image reader is moved into and retracted from the support plate on which the selected microfilm cartridge is stored.

A still further object of this invention is to provide a microfilm searching and reading device in which a scanner including a driving unit is moved to the position vicinal to the selected microfilm cartridge so that a drive shaft of the driving unit engages with the driven shaft of the selected microfilm cartridge.

Yet a further object of this invention is to provide a microfilm searching and reading device in which a small size scanner is used so that it is snugly contained within the storage rack.

Another object of this invention is to provide a microfilm searching and reading device in which the optical system of the scanner is separated from the environment so that sticking of dusts or other stains is prevented to facilitate maintenance of the scanner.

With the aforementioned objects in view, the present invention provides microfilm searching and reading device for selecting a microfilm cartridge containing a target image from multiple microfilm cartridges and for reading the target image to put out image data, comprising:

a storage rack having multiple support plates on which said microfilm cartridges are stored, said support plates being arranged along the vertical direction one above another;

a scanner facing to said storage rack to move along the vertical direction and including an image reader and a driving unit for winding and rewinding the microfilm roll contained in said selected microfilm cartridge;

ejector mechanisms mounted on respective support plates for transferring said selected cartridge to said scanner;

memory means for storing the positional data of respective microfilm cartridges; and control means for putting out instructions to allow said scanner to move to the position facing to said selected microfilm cartridge and to allow said image reader to read said target image.

According to a further aspect of the invention, there is provided a microfilm searching and reading device for selecting a microfilm cartridge containing a target image from multiple microfilm cartridges and for reading the target image to put out image data, comprising:

a storage rack having multiple support plates on which said microfilm cartridges are stored, said support plates being arranged along the vertical direction one above another;

a scanner facing to said storage rack to move along the vertical direction and also to move into and retract from said storage rack, said scanner including an image reader and a driving unit for winding and rewinding the microfilm roll contained in said selected microfilm cartridge;

memory means for storing the positional data of respective microfilm cartridges; and control means for putting out instructions to allow said scanner to move to the position facing to said selected microfilm cartridge and to allow said image reader to read said target image.

According to a still further aspect of the invention, there is provided a microfilm searching and reading device for selecting a microfilm cartridge containing a target image from multiple microfilm cartridges and for reading the target image to put out image data, comprising:

a storage rack for storing multiple microfilm cartridges, said microfilm cartridges having driven shafts and being stacked one above another in the inclined posture relative to the vertical direction with said driven shafts uncovered by adjacent cartridges;

a scanner facing to said storage rack to move along the vertical direction and including an image reader and a driving unit for winding and rewinding the microfilm roll contained in said selected microfilm cartridge, said driving unit having an drive shaft removably engaging with said driven shaft of said selected microfilm cartridge to wind and rewind the microfilm roll contained in said selected microfilm cartridge;

memory means for storing the positional data of respective microfilm cartridges; and control means for putting out instructions to allow said scanner to move to the position vicinal to said selected microfilm cartridge and to allow said image reader to read said target image.

The present invention further provides a microfilm searching and reading device for selecting a microfilm cartridge containing a target image from multiple microfilm cartridges and for reading the target image to put out image data, comprising:

a storage rack having multiple support plates on which microfilm cartridges are stored, said support plates being arranged along the vertical direction one above another, each of said support plates having a driven disk for engaging with the reel of the microfilm cartridge stored on each support plate;

a scanner facing to said storage rack to move along the vertical direction and including an image reader and a driving unit for winding and rewinding the microfilm roll contained in said selected microfilm cartridge, said driving unit comprising a drive roller detachably engaging with said driven disk;

memory means for storing the positional data of respective microfilm cartridges; and control means for putting out instructions to allow said scanner to move to the position facing to said selected microfilm cartridge and to allow said image reader to read said target image.

Instead of providing driven disks for respective support plate, each microfilm cartridge having driven disks integral with its reels to be driven by the drive rollers of the driving unit.

The present invention further provides a microfilm searching and reading device for selecting a microfilm cartridge containing a target image from multiple microfilm cartridges and for reading the target image to put out image data, comprising:

a storage rack having multiple support plates on which microfilm cartridges are stored, said support plates being arranged along the vertical direction one above another;

a rotary shaft rotatably mounted on each support plate and having an upper end protruding above the upper surface of said support plate to engage with the center bore of the reel of said microfilm cartridge and an lower end protruding below the lower surface of said support plate to be fixedly connected to a driven disk;

a scanner facing to said storage rack to move along the vertical direction and including an image reader and a driving unit for winding and rewinding the microfilm roll contained in said selected microfilm cartridge, said driving unit comprising a drive roller detachably engaging with said driven disk;

memory means for storing the positional data of respective microfilm cartridges; and control means for putting out instructions to allow said scanner to move to the position facing to said selected microfilm cartridge and to allow said image reader to read said target image.

The present invention further provides a microfilm searching and reading device for selecting a microfilm containing a target image from multiple microfilms reels and for reading the target image to put out image data, comprising:

a storage rack having multiple support plates on which microfilm reels are stored, said support plates being arranged along the vertical direction one above another;

a pair of scanners disposed at the opposite sides of said storage rack and each facing to said storage rack to move along the vertical direction and including an image reader and a driving unit for driving the selected microfilm reel to wind and rewind the microfilm;

memory means for storing the positional data of respective microfilm reels; and control means for putting out instructions to allow said scanner to move to the position facing to said selected microfilm reel and to allow said image reader to read said target image.

The access time can be further decreased since respective scanner read images from different microfilm cartridges.

The present invention further provides a microfilm searching and reading device for selecting a microfilm cartridge containing a target image from multiple microfilm cartridges and delivering the selected cartridge to a scanner where the target image is read by an image sensor to put out image data, characterized in that said scanner comprises:

(a) a compartment defining a cavity receiving said selected microfilm cartridge;

(b) a take-up reel for taking up microfilm roll contained in said selected microfilm cartridge; and (c) an image reader disposed between said compartment and said take-up reel;

said image reader including:

(i) a projection lens system disposed between said compartment and said take-up reel;

(ii) an image sensor disposed between said compartment and said take-up reel; and (iii) a light source facing to one surface of the microfilm roll opposite to the side at which said projection lens is positioned.

The present invention further provides a microfilm searching and reading device for selecting a microfilm cartridge containing a target image from multiple microfilm cartridges and transferring the selected cartridge to a scanner where the target image is read by an image sensor to put out image data, characterized in that said scanner comprises an image reader which includes:

a casing having at least one transparent wall facing to the microfilm contained in said selected cartridge and containing therein a projection lens system and an image sensor; and a light source disposed outside of said casing and projecting said target image onto said image sensor through said transparent wall and said projection lens system.

The present invention further provides an image reader comprising a light source, a projection lens system and an image sensor onto which the image of a microfilm is projected by said light source through said projection lens system, an improvement characterized in that said light source is an EL panel which is closely engaged with one surface of said microfilm during the image reading operation.

When the projection lens system and the image sensor are sealingly contained in a housing, the easy maintenance of the system is realized.

DESCRIPTION OF THE DRAWINGS

While the specification concludes with claims particularly pointing out and distinctly claiming the subject matters of the invention, it is believed that the invention will be better understood from the following description of preferred embodiments, taken in conjunction with the accompanying drawings in which:

FIG. 10 is a schematic illustration showing a system with which a second embodiment of this invention is associated;

FIGS. 38 and 39 are schematic plan views showing modified designs of the scanner.

DESCRIPTION OF PREFERRED EMBODIMENTS

Better understanding of the present invention will be had from the following description of preferred embodiments thereof.

First Embodiment

Figure 1:
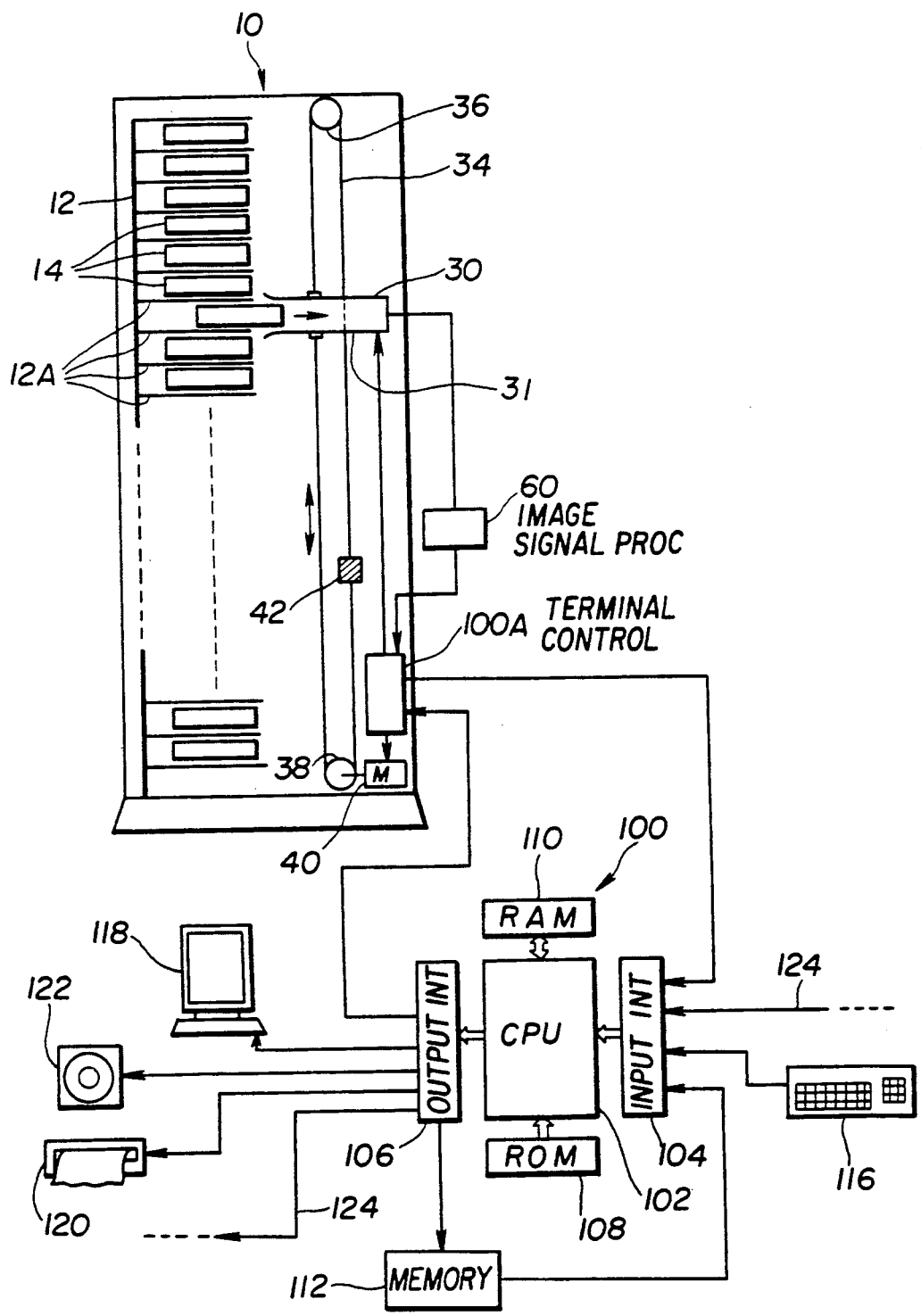
FIG. 1 is a schematic illustration showing a system with which a first embodiment of the invention is associated.
Figure 5:
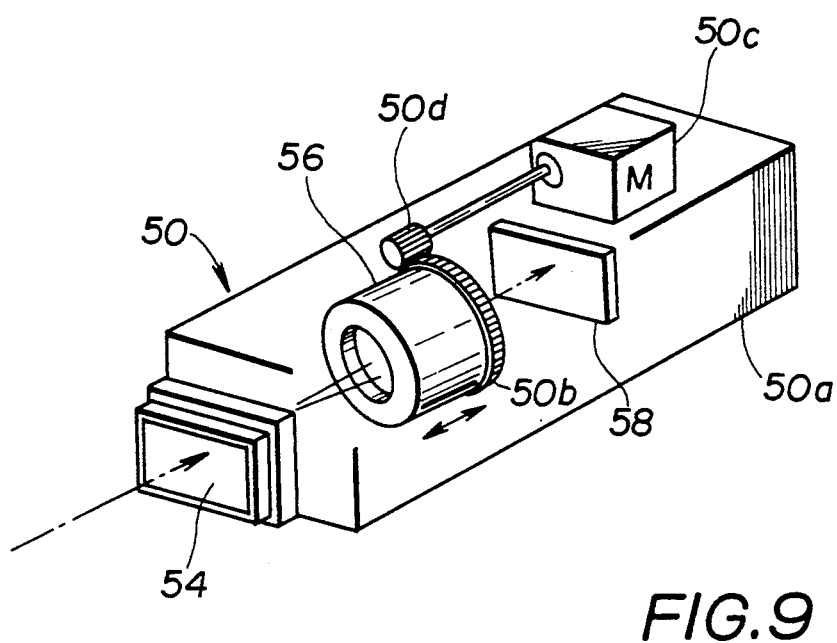
FIG. 5 is a perspective view of an image reader according to the invention.
Figure 6:
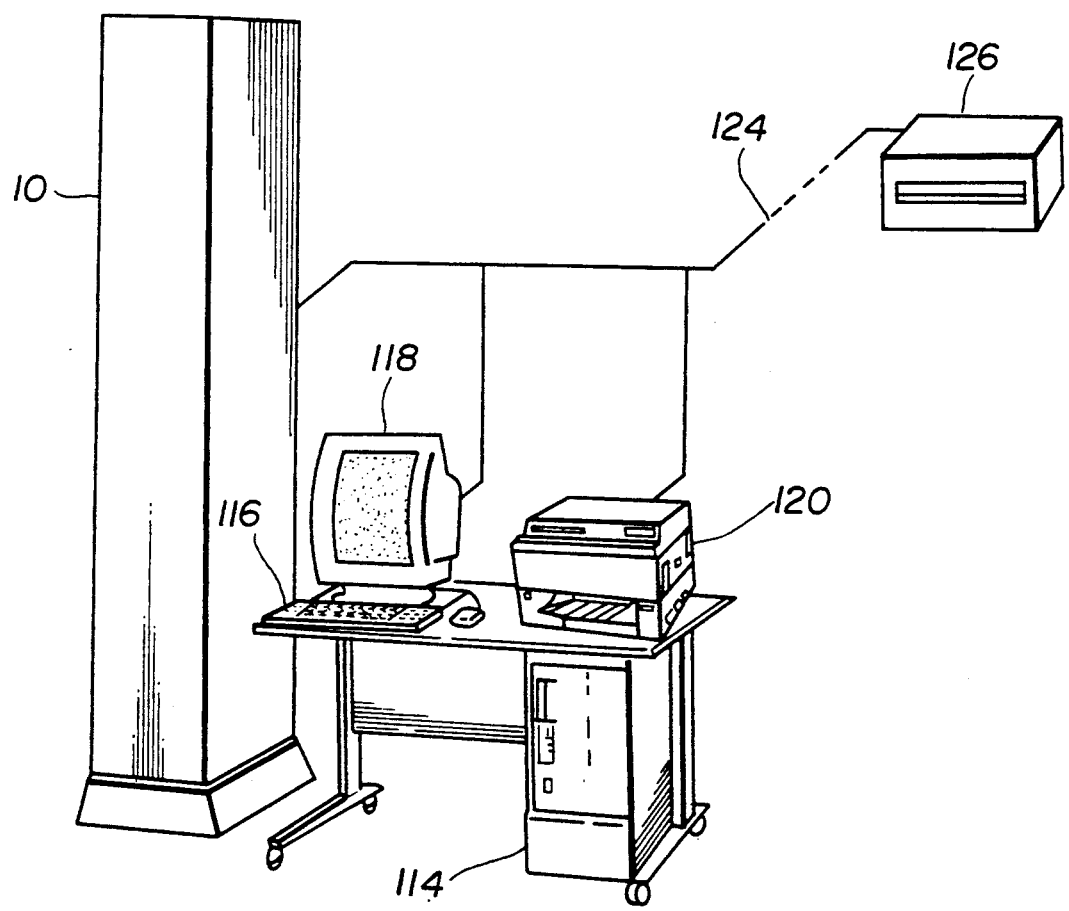
FIG. 6 s a schematic illustration showing a system in which the first embodiment of this invention is incorporated.
Figure 7:
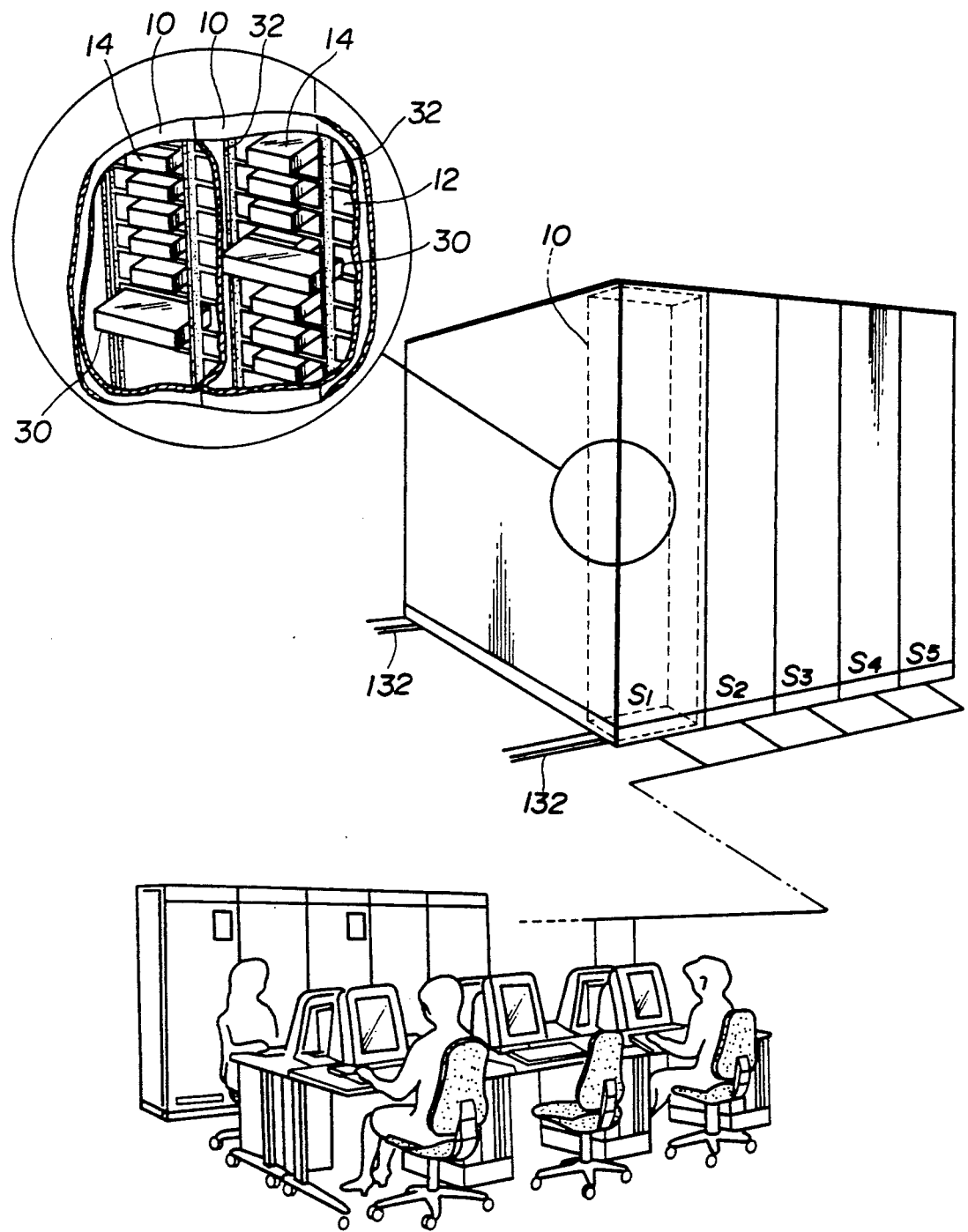
FIG. 7 is a diagrammatical view showing a large scale system in which an embodiment of the invention is incorporated.

Initially referring to FIGS. 1 to 7, a first embodiment of the invention will be described in detail. As shown in FIGS. 1, 6 and 7, a casing has a generally rectangular cross section and denoted by reference numeral 10. At one side of the casing 10, a rack 12 is disposed and has multiple support plates 12A arranged along the vertical direction one above another. Microfilm cartridges 14 are stored on these support plates 12A. In each microfilm cartridge 14, a reel 15 is contained and a continuous microfilm roll 16 is wound around the reel 15, as best seen in FIGS. 2 and 4.

Figure 3:
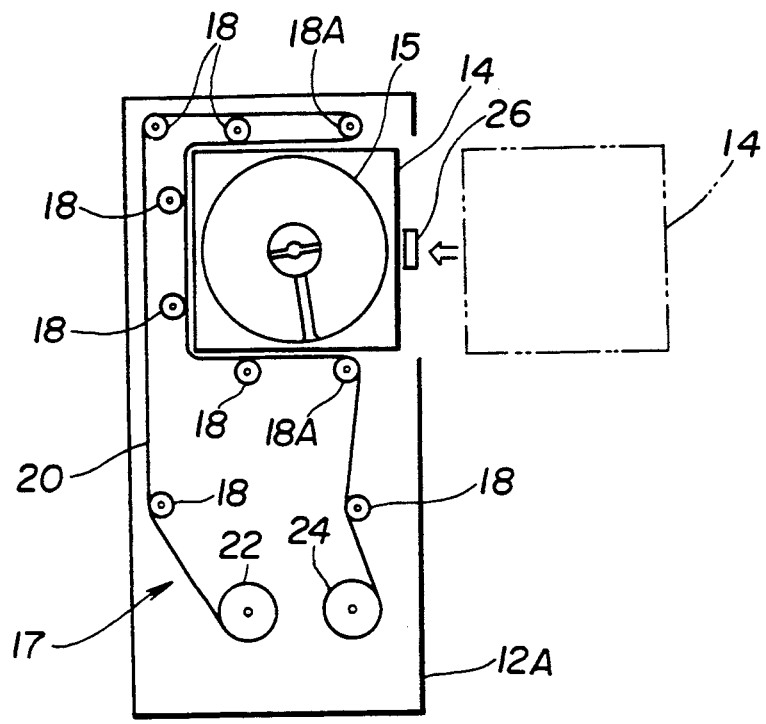
FIG. 3 is a plan view showing a microfilm cartridge stored on a support plate of the storage rack of the first embodiment.
Figure 4:
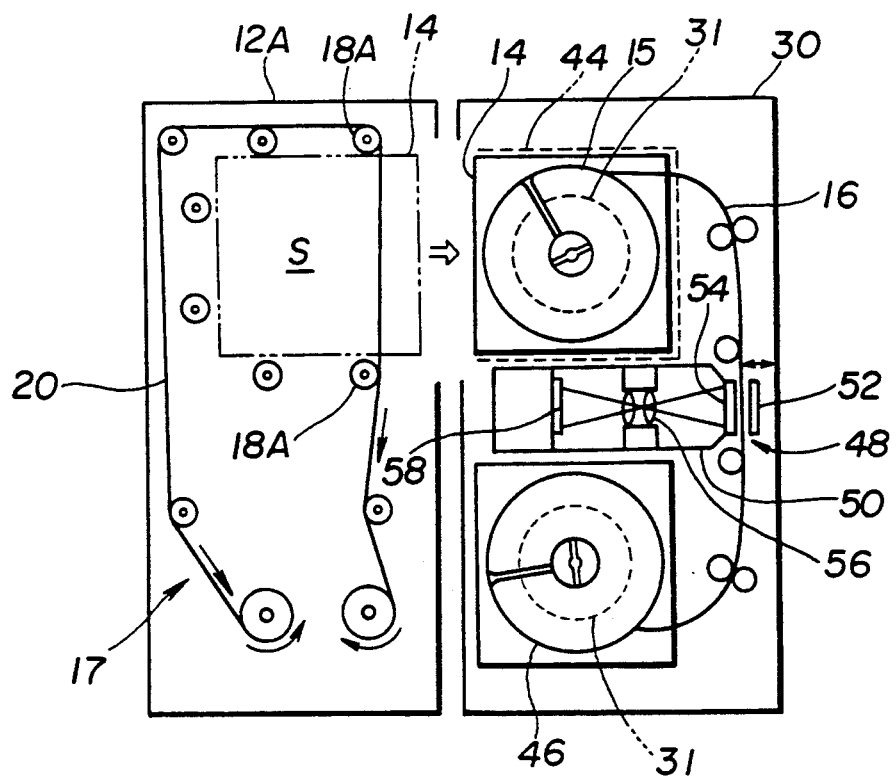
FIG. 4 is a plan view showing a microfilm cartridge ejected from the support plate and received in the scanner of the first embodiment.

An ejector mechanism 17 for ejecting the microfilm cartridge 14 is mounted on each support plate 12A of the storage rack 12, as shown in FIGS. 3 and 4. As shown, plural guide rollers 18 are arranged on the support plate 12A, and a belt 20 preferably made of a resilient material is stretched along a path defined by the guide rollers 18 and has the ends fixed to tension pulley wheels 22 and 24. The tension pulley wheels 22 and 24 are biased to wind up the belt 20 so that some tension is applied through the belt 20. The cartridge 14 inserted from the right side as seen in FIG. 3 pushes the belt 20 to be moved into a cartridge storing compartment S defined by the dots-and-dash line in FIG. 4 where it is locked by a stopper 26 with its three sides surrounded by the belt 20. The stopper 26 is controlled by a scanner 30, which will be described in detail hereinafter, to release the cartridge 14 as desired. Upon release from the locking action of the stopper 26, the cartridge 14 is automatically ejected toward the scanner 30 due to the tension of the belt 20. The guide rollers 18, the belt 20, the tension pulley wheels 22, 24 and the stopper 26 constitute a belt mechanism acting as the ejector mechanism.

Figure 2:
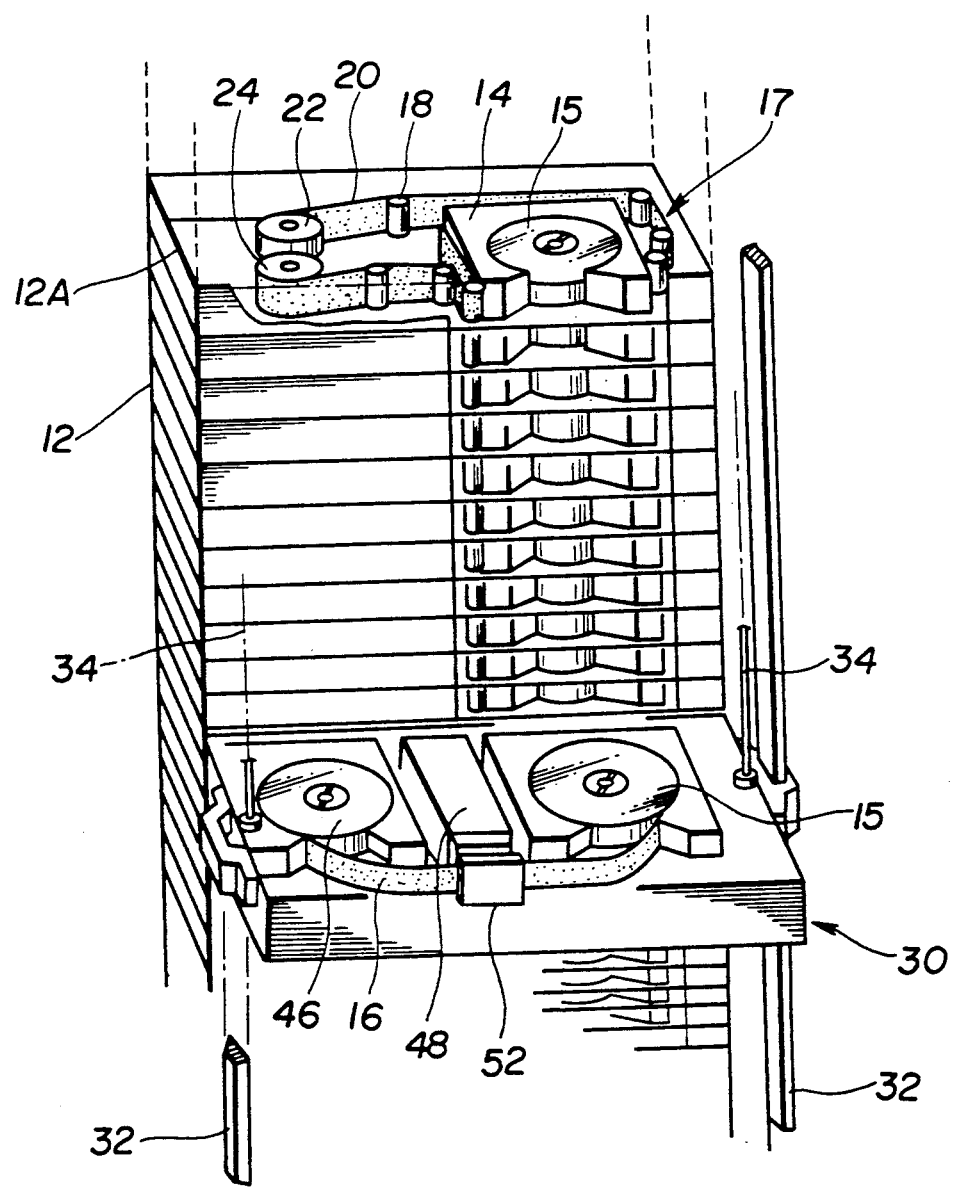
FIG. 2 is a perspective view showing a portion of the storage rack and the scanner of the first embodiment.

Details of the scanner 30 are shown in FIGS. 1, 2, 4 and 7. The scanner 30 travels along the vertical direction in the casing 10 while facing to the front side of the rack 12. As shown in FIG. 2, the scanner 30 is suspended by a pair of wires 34, 34 and slidingly guided by right and left paired guide rails 32, 32 to travel along the vertical direction. Each wire 34 runs around an upper pulley 36 and a lower pulley 38 (see FIG. 1) and has its ends fixed to the top and bottom faces of the scanner 30. The lower pulley 38 is rotated by a servo motor 40 so that the scanner 30 travels along the vertical direction. Each wire 34 is attached with a counter-weight 42 at the position symmetrical to the scanner 30 so as to reduce the loading applied on the motor 40.

The construction of the scanner 30 is shown in FIG. 4 which shows the scanner 30 facing the support plate 12A on which the selected microfilm cartridge 14 is stored. The scanner 30 has a cavity 44 for receiving therein the opposing cartridge 14, a take-up reel 46, an image reader 48 disposed between the cartridge 14 and the take-up reel 46, and a microfilm driving unit 31 for actuating the reels 15 and 46 to wind and rewind the microfilm roll 16. In the illustrated embodiment, one side of the scanner 30 faces to the front side of the rack 12 and the scanner travels to a position horizontally aligned with one support plate 12A in the casing 10 which has, for example, a substantially square cross section of about 30 cm × 30 cm.

The image reader 48 comprises a sealed reader unit 50 and an EL (electroluminescence) panel 52 which serves as a light source. The EL panel 52 is pressed onto and separated from the roll film 16 and may be controlled, for example, by an electromagnetic plunger (not shown) or like means.

For instance, the EL panel 52 is separated from the roll film 16 during the film loading operation and during the winding and rewinding operation, and it engages with the film surface when the target image comes in position so that the film roll 16 is sandwiched between the EL panel 52 and the glass plate 54. In order to facilitate easy film loading, the EL panel 52 may be tilted or retracted upwards or downwards. The EL panel 52 may have an even illuminance over the entire area thereof. However, since there is a tendency that the spot corresponding to the optical axis has the highest illuminance and the region remoter from the optical axis is relatively dark to result in uneven illuminance, it is thus needed to correct such unevenness in illuminance by the image signal processing circuit. For this purpose, the illuminance distribution of the EL panel is intentionally varied so that the light quantities incident on the image sensor become even by reducing the illuminance of the area closer to the optical axis of the EL panel 52 and gradually increasing the illuminance of the area remoter from the optical axis.

The reader unit 50 includes a transparent plate member, which may be a glass plate 54 facing to the EL panel 52, a projection lens system 56 sealingly contained in a casing 50a, and an image sensor 58 which is also sealingly contained in the casing 50a. As shown in FIG. 5, the projection lens system 56 may be moved along its optical axis within the casing 50a by a cam mechanism. In detail, large gear 50b is provided around the outer periphery of the projection lens system 56, and the gear 50B meshes with a small gear 50d which is mounted on the shaft of a motor 50c. As the motor 50c rotates, the projection lens system 56 moves along its optical axis to the focused position. Alternatively, the projection lens system 56 may be moved along its optical axis, by means of a piezoelectric element, so that the target image on the microfilm roll 16 is precisely focused on the image sensor 58.

As the scanner 30 comes to the position facing the selected microfilm cartridge 14, the stopper 26 is unlocked to release the cartridge 14 which is ejected by the tension of the belt 20 to be received in the cavity 44 of the scanner 30. The driving unit 31 is then actuated to rotate the reels 15 and 46 so that the microfilm roll 16 runs through the gap between the EL panel 52 and the glass plate 54. During this searching operation, the EL panel 52 is separated from the microfilm roll 16. When the target image comes in position, the driving unit 31 is stopped and the EL panel 52 is moved to press the microfilm roll 16 onto the glass plate 54. The EL panel 52 serves as a surface area light source so that the image on the microfilm roll 16 is projected through the glass plate 54 and the projection lens system 56 to the image sensor 58. The image sensor 58 scans the image to put out time series image signals a as image data (see FIG. 1). The signals a are binarized by an image signal processing circuit 60 and fed to a control means 100A. Although the image sensor 58 is preferably a two-dimensional area sensor, a unidirectional line sensor may be used while being moved in the direction normal to the length direction (i.e. the subsidiary scanning direction) to read the image.

In the illustrated embodiment, the control means includes terminal control means 100A housed in respective casing 10 and a central control means 100 providing these terminal control means 100 with informations relating to the cartridge to be selected and address information relating to the target image. However, the functions of the control means may be further scattered. For example, control means solely for controlling focus adjustment operation may be housed in the casing 50a of the reader unit 50.

The control means 100 comprises a small size computer, and has a CPU 102, an input interface 104, an output interface 106, a ROM 108 for storing a control program, and a RAM 110 for storing various data necessary for control operations including, for example, auto-focusing operation. A memory means 112 is constituted of a memory medium such as an optical disk, a magnetic disk, a magnetic tape or a semiconductor memory medium, and stores the data relating to the addresses of the cartridges stored in the rack 12. These control means 100 and memory means 112 are contained in a cabinet 114 shown in FIG. 6.

Data relating to the contents and addresses of respective microfilm cartridges 14 are put through a keyboard 116 in the CPU 102 to be stored by the memory means 112. In searching a target image, the code number or other necessary datum is put in the CPU 102 through the keyboard 116. The CPU 102 puts out the address information relating to the position of the a cartridge 14 containing the target image and relating to the location of the target image into the terminal control means 100A. The terminal control means 100A selects the cartridge 14 in response to the address informations fed from the CPU 102 to actuate the motor 40 so that the scanner 30 is allowed to travel to the position facing to the designated microfilm cartridge 14. The stopper 26 engaging with the designated microfilm cartridge 14 (as shown in FIG. 3) is unlocked to release the designated cartridge 14 which is ejected from the rack 12 to be received in the cavity 44 of the scanner 44 as shown in FIG. 4. Thereafter, the terminal control means 100A controls the driving unit 31 so that the reels 15 and 46 are rotated in the scanner 30 until the target image comes to the position between the EL panel 52 and the glass plate 54. Identification of the target image may be effected by sensing a retrieval mark (not shown) attached to each frame of the microfilm roll 16 by an additional photo-sensor (not shown). The retrieval mark can, of course, be sensed by the image sensor 58.

The terminal control means 100A supplies an instruction for pressing the EL panel 52 onto the microfilm roll 16 and for allowing the EL panel 52 to emit light as the target image comes in situ in front of the glass plate 54. The target image is thus projected on the image sensor 58. The image signals a from the image sensor 58 are processed by the signal processing circuit 60 to correct the scattering of performance characteristics of photosensitive elements, to correct the shading and to shape the wave-form, and then the image signals a are binarized to be fed to the terminal control means 100A. When auto-focusing operation is needed, the circuit 60 selects the predetermined space frequency components of the image signals a by means of a band pass filter, and the absolute values of the selected components are integrated to determine the contrast signal. The terminal control means 100A controls the projection lens system 56 to move the same to the position where the contrast signal takes the maximum value. The auto-focusing operation may be carried out by a separate auto-focusing element, for example, auto-focusing may be carried out by a phase difference detecting element.

The image signals read by the scanner 30 may be fed through the central control means 100 to a variety of image processing devices, such as a cathode ray tube (CRT) 118, a printer 120, an optical disk device 122 or other type external memory means. It is also possible to feed the data through a data communication network 124, such as LAN (local area network), to a facsimile 126 or a CRT settled at a remote place (see FIG. 6). Likewise, by the utilization of the CPU 102, data from external image processing devices may be read through the data communication network 124 so that image data from external systems may be utilized and processed in the device of this invention.

FIG. 6 shows a smallest scale system in which the first embodiment of this invention is incorporated. As shown, the system has one casing 10 combined with a work station. The work station has a keyboard 116, a CRT 118, a printer 120 and a cabinet 114 containing the control means 100 and the memory means 112 (see FIG. 1).

Since the central control means 100 and terminal control means 100A separatedly housed in respective casing 10 are used in this embodiment, multiple casings 10 may be readily assembled to fabricate a large system. However, within the scope of this invention, all operations of the device may be controlled by the central control means 100 without using the terminal control means 100A. A separate control means may be provided in each casing 50a of the image reader 48 for controlling solely the auto-focusing operation.

FIG. 7 shows a large scale system in which the embodiments of this invention are incorporated. In the illustrated system, five stack assemblies $S_1$ to $S_5$ are movably placed on tracks 132 and connected to plural work stations. Each of the stack assemblies $S_1$ to $S_5$ contains several casings 10 storing therein multiple microfilm cartridges.

It will be appreciated that a large scale system may be easily installed, according to this embodiment, by only combining multiple casings 10 with each other. The access time can be further decreased by controlling the operations in casings 10 simultaneously in parallel. For example, in order to decrease the access time, when one cartridge 14 stored in one casing 10 is placed in the scanner 30 to read the target image, a next cartridge 14 in another casing 10 is brought into the cavity 44 of the scanner 30 and operation for searching the target image is carried out to be ready for reading the image.

Plural casings 10 may be located separately and connected with each other through a data communication network 124 so that the microfilm cartridges 14 contained therein may be utilized in response to the instructions from any work stations. It is also possible to utilize the same image in any one microfilm cartridge 14 simultaneously at different work stations.

Figure 8:
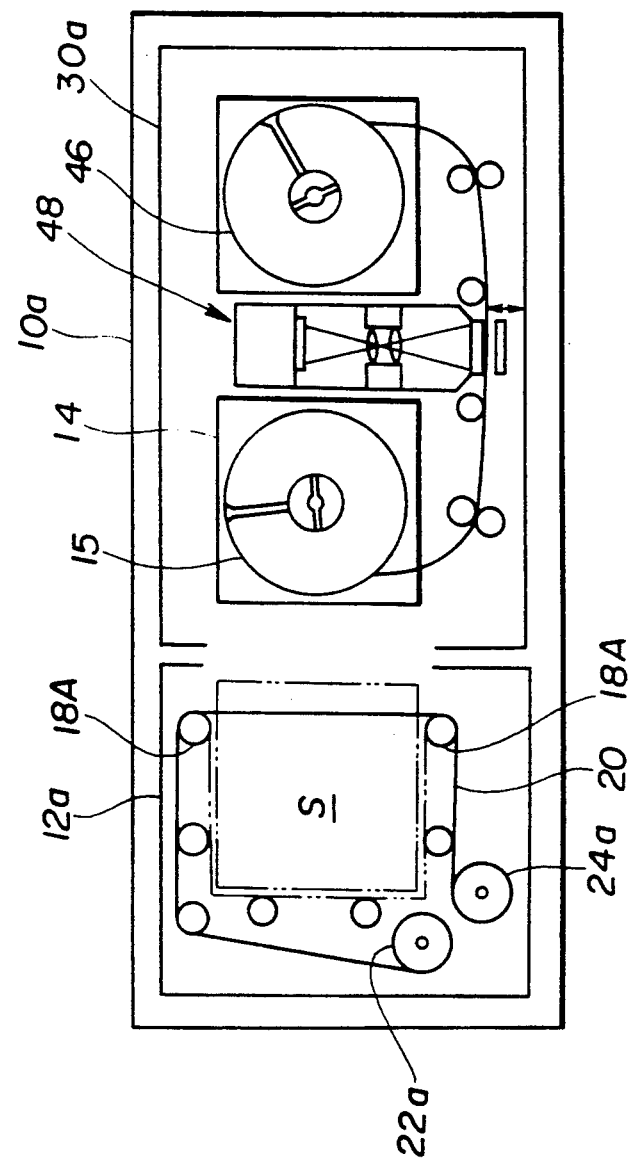
FIG. 8 is a plan view showing a microfilm cartridge stored on a support plate and also showing a scanner of another embodiment.

Another embodiment of this invention is shown in FIG. 8 which shows the interrelation between a storage rack 12a and a scanner 30a arranged in a manner different from that described hereinabove. In this embodiment, since the tension pulley wheels 22a and 24a are positioned closer to the compartment S, the storage rack 12a can be aligned with the longitudinal direction of the scanner 30a. As an advantage of such arrangement, the casing 10a may have a rectangular cross section with a smaller width and thus can be snugly accommodated in a space close to the walls of the room.

Although it has been described that the projection lens system 56 is moved in the focusing operation, focusing may be achieved by moving the other part of the scanner. For example, glass plate 54 may be moved along the optical axis close to or remote from the casing 50a, or the image sensor 58 may be moved. If the magnification of the projection lens system 56 is changed by the focusing operation, the output signal from the image sensor 58 may be processed electrically to correct the magnification.

In the embodiments described hereinbefore, since the scanner 30 travels along the vertical direction while facing to the rack 12 having multiple support plates 12A overlapping with one another, the cartridges are directly transferred from the storing rack 12 to the scanner 30 to decrease the access time for reading the target image. The dimensions of one casing can be decreased as compared to the conventional devices to reduce the space required for installation. Furthermore, the device of the invention can be readily adapted for change in system scale only by increasing or decreasing the number of casings 10 assembled in the system.

Since the scanner of this embodiment has the image reader disposed between the take-up reel and the cavity in which the selected cartridge is received, the size of the scanner can be reduced to enable storage thereof in the storage rack.

Since the projection lens system and the image sensor of the image reader are contained in a sealed space defined by the glass plate and the casing, the image reader can be contained compactly within the storage rack with additional advantage that the optical system of the image reader is prevented from sticking of dust or other stain to facilitate easy maintenance.

Figure 9:
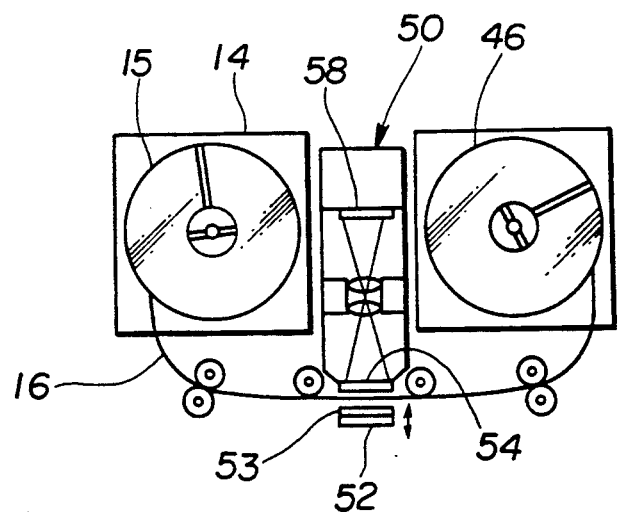
FIG. 9 is a plan view showing the arrangement of another EL panel.

Furthermore, since the light source of the scanner of this embodiment is composed of an EL panel which is closely pressed onto the film during the light transmitting through the film is sensed by the image sensor, additional lens system serving as a light source need not be provided. Accordingly, the optical system for the light source can be significantly simplified, and the total size of the image reader can be reduced. Meanwhile, the EL panel 52 may be pressed onto the film 16 through a transparent plate 53 (see FIG. 9).

Although it has been described that the scanner of the aforementioned embodiment is used in a system for reading the image in a microfilm, it should be appreciated that the invention should not be limited to the microfilm reader but may be applied various image readers, and thus it is intended to embrace all such manifold applications within the scope of the invention.

Second Embodiment

The following is the description of a third embodiment wherein a scanner is moved into a storage rack to read the target image and then retracted from the storage rack.

Figure 11:
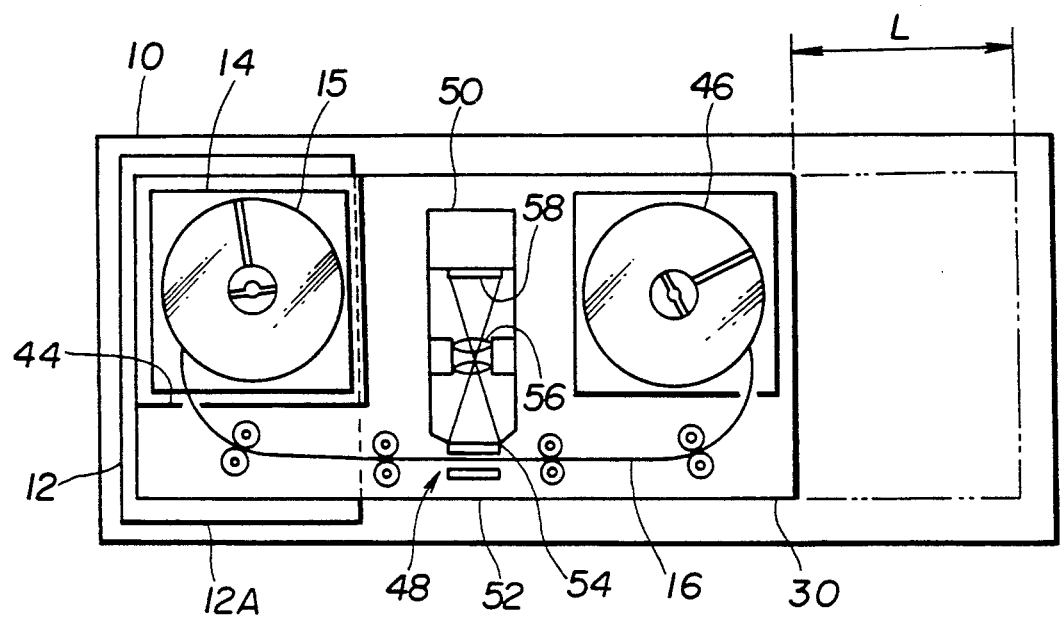
FIG. 11 is a plan view showing the second embodiment when the scanner is moved into the support plate on which the selected microfilm cartridge is stored.
Figure 12:
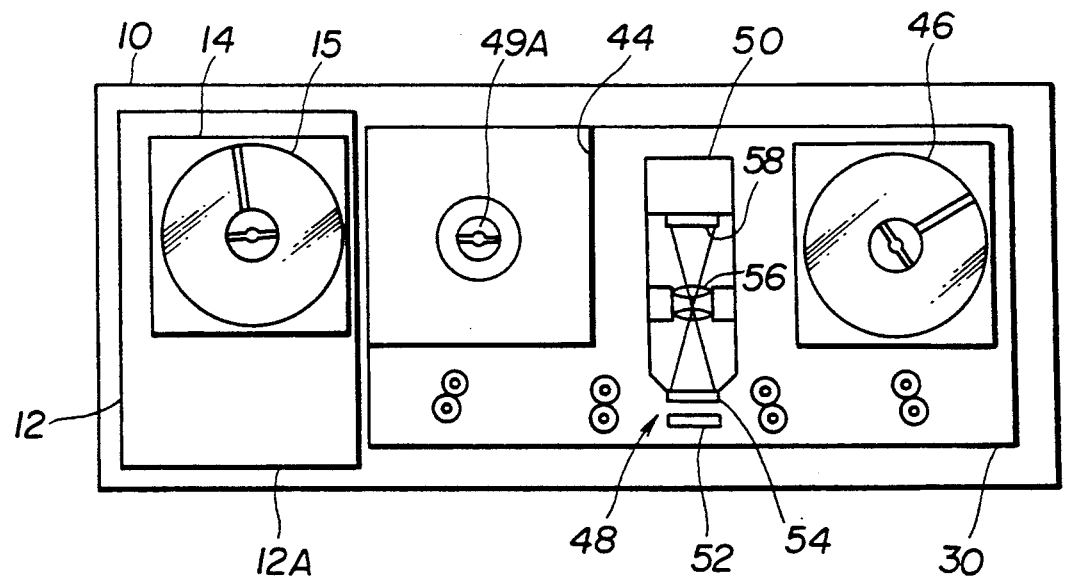
FIG. 12 is a plan view, similar to FIG. 11, showing the second embodiment when the scanner is retracted from the support plate.

FIG. 10 is a schematic illustration showing a system with which the second embodiment of this invention is associated; FIG. 11 is a plan view showing the second embodiment when the scanner is moved into the support plate on which the selected microfilm cartridge is stored; and FIG. 12 is a plan view, similar to FIG. 11, showing the second embodiment when the scanner is retracted from the support plate. In these Figures, the same parts or members as used in the first embodiment are denoted by the same reference numerals (see FIG. 1) and detailed descriptions thereof will not be repeated.

The scanner 30 travels within the casing 10 along the vertical direction while facing to the front side of the storage rack 12, and moves into and retracts from the rack 12. The scanner 30 is suspended by a pair of wires 34, 34 (see FIG. 10) and slidingly guided by right and left paired guide rails 32, 32 (see FIG. 7) to travel along the vertical direction. The scanner 30 is retractably movable by a distance L as shown in FIG. 11.

The construction of the scanner 30 of the second embodiment is shown in FIGS. 11 and 12. As shown, the scanner 30 is provided with a cavity 44 in which a selected cartridge 14 on a certain support plate 12A is received when the scanner 30 moves into the rack 12, and comprises a take-up reel 46, an image reader 48 disposed between the take-up reel 46 and the rack 12, and a microfilm driving unit 49 (see FIG. 10) for actuating the reels 15 and 46 to wind and rewind the microfilm roll 16. The driving unit 49 has a drive shaft 49A for driving the reel 15, the drive shaft 49A being movable along the vertical direction so that it is lowered as the scanner is moved into or retracted from the rack 12 and it is raised to engage with the driven shaft of the reel 15 so as to rotate the reel 15 when the scanner 30 is retained in the position within the rack 12 for searching and reading the target image.

When the scanner 30 travels to the position facing to the selected microfilm cartridge 14, the scanner 30 is moved into the rack 12 with the drive shaft 49A being lowered so that the reel 15 of the selected cartridge 14 is received in the cavity 44. Thereafter, by the instruction from the CPU 102, the drive shaft 49A is raised to engage with the driven shaft of the reel 15, and then the reels 15 and 46 are rotated until the target image comes to the position between the EL panel 52 and the glass plate 54. The target image is then read by the image reader 50.

As will be appreciated from the foregoing, the access time required for reading the target image can be further decreased according to the second embodiment of the invention, since only the scanner 30 per se moves in a manner such that it travels along the vertical direction while facing to the storage rack 12 containing multiple microfilm cartridges 14 and then moves into the rack 12 to receive the selected cartridge 14 which is read by the image reader 50.

Likewise in the first embodiment, the operations taking place in each casing 10 may be controlled by a control means 100A disposed separately in each casing 10 in the second embodiment.

Third Embodiment

Figure 13:
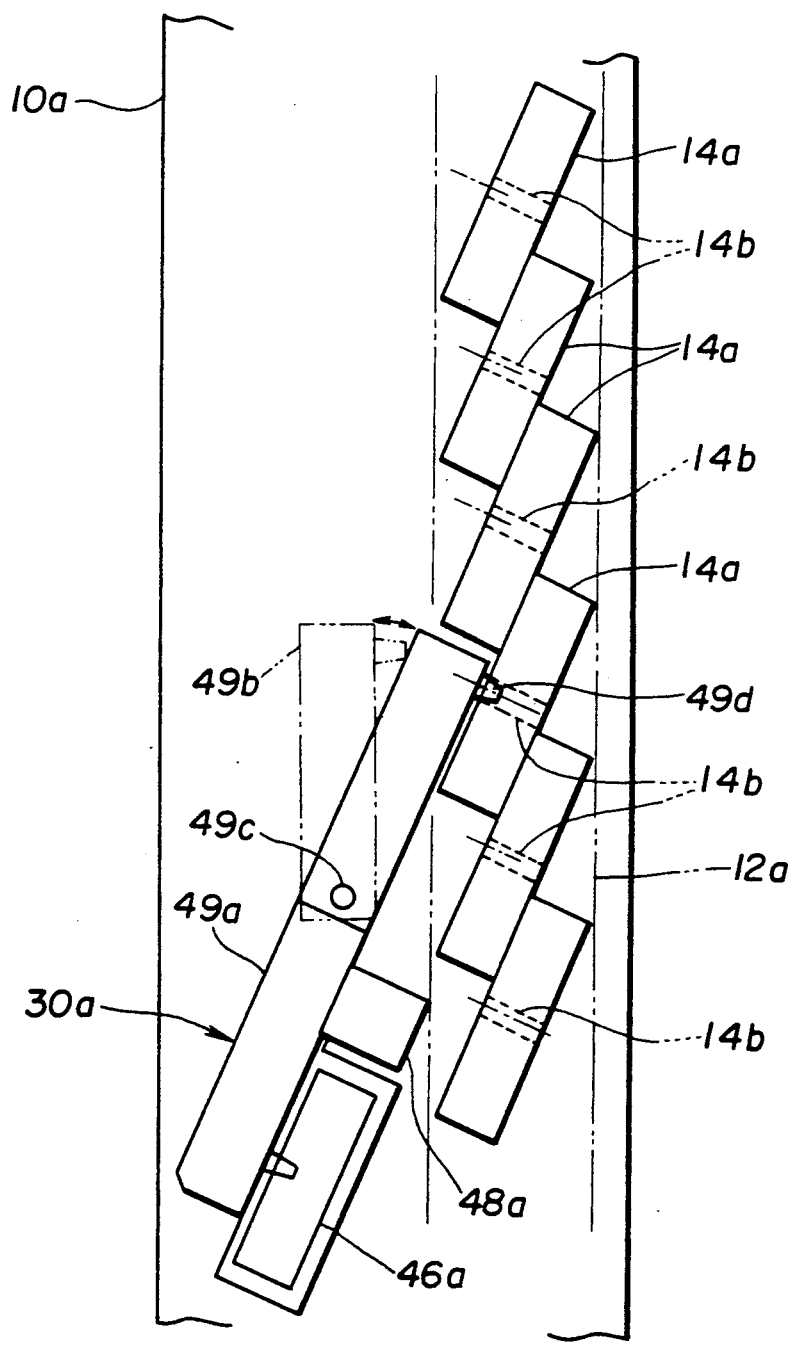
FIG. 13 is a diagrammatical sectional view showing stored microfilm cartridges and the scanner of a third embodiment of this invention.

A third embodiment of the invention is shown in FIG. 13 which shows diagrammatically microfilm cartridges 14a stored in a storage rack 12a and a scanner 30a, the arrangements of the cartridges 14 and the scanner 30 being different from those of preceding embodiments. In the storage rack 12a, cartridges 14a are stored while being inclined relative to the vertical direction and stacked one above another. The scanner 30a has an articulated structure so that the upper half 49b of its film driving unit 49a is swingable about a pin 49c. As the scanner 30a travels in the vertical direction, the upper half 49b is retained in the posture shown by the dots-and-dach line in FIG. 13 so that it is separated from the stack of the cartridges 14a. When the scanner 30 comes to the position aligned with the inclined plane of the selected cartridge 14a, the upper half 49b is swung to occupy the position shown by the real line in FIG. 12 so that a drive shaft 49d engages with a driven shaft 14b of the cartridge 14a. The microfilm in the cartridge 14a is then wound to be taken up by a take-up reel 46a until the target image comes in position. The target image is then read by an image reader 48a.

The third embodiment provides an advantage that the space required for installation of the casing 10a can be further reduced.

Fourth Embodiment

A fourth embodiment, in which a driven disk is provided on each support plate of the storage rack, will now be described with reference to FIGS. 14 to 17.

Figure 14:
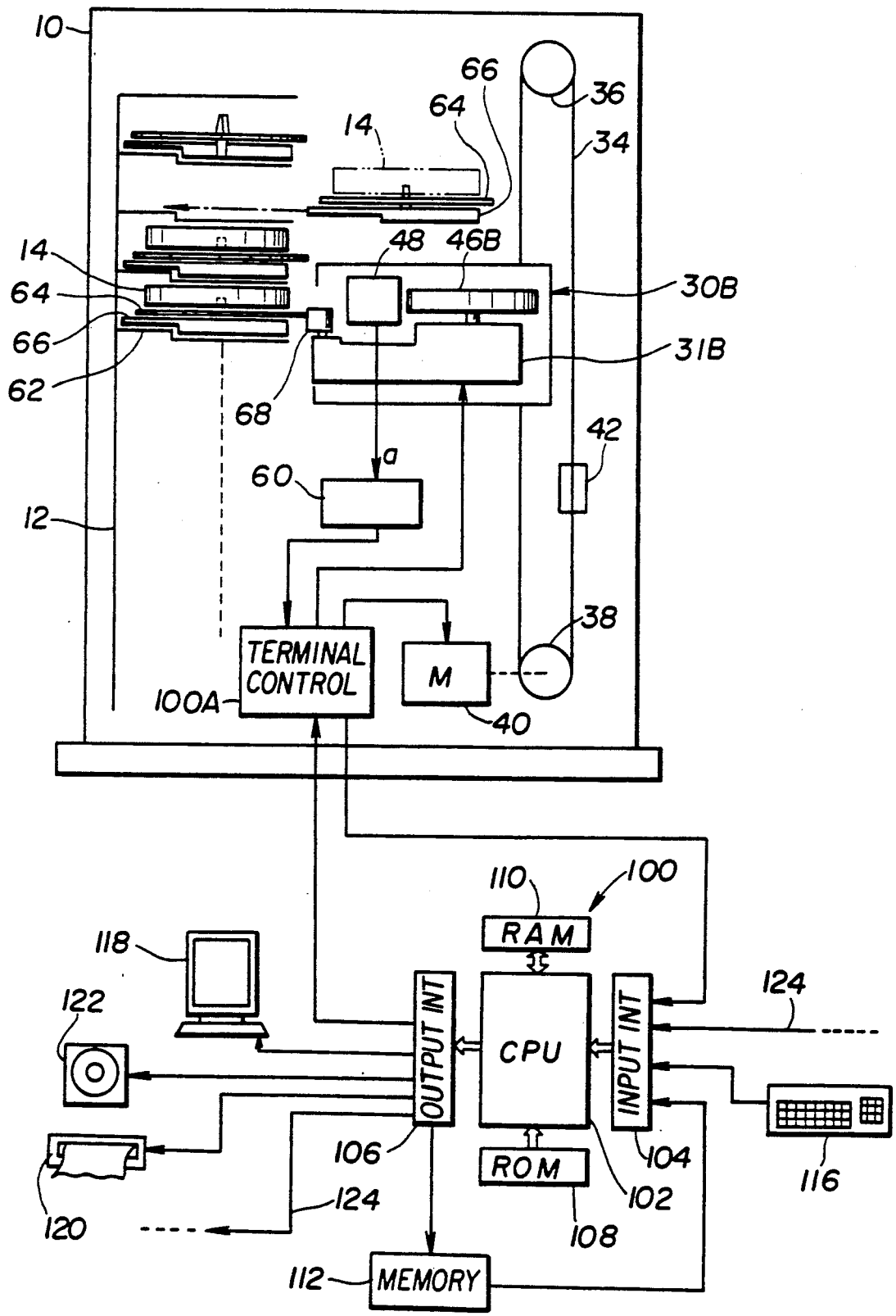
FIG. 14 is a schematic illustration showing a system in which a fourth embodiment of the invention is incorporated.
Figure 15:
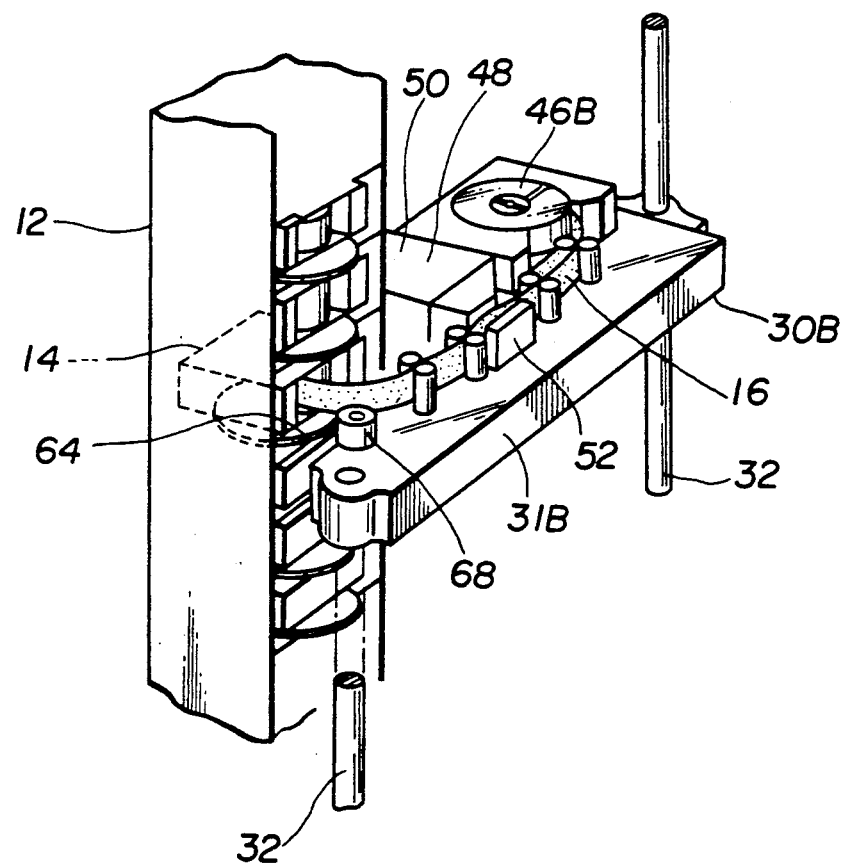
FIG. 15 a fragmentary perspective view showing the scanner and one of the storage racks of the fourth embodiment.
Figure 16:
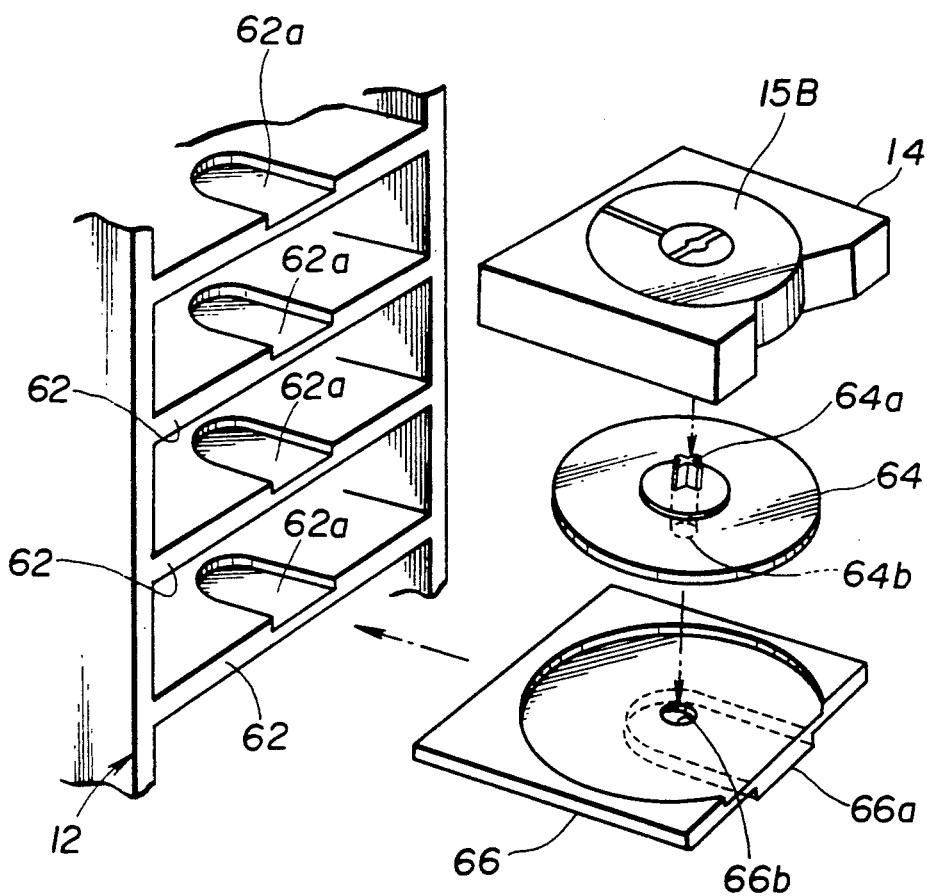
FIG. 16 is an exploded view showing the detailed construction of one support plate of the storage rack and a cartridge stored on the support plate.

Initially referring to FIG. 14 showing a system in which the fourth embodiment is incorporated, each support plate 62 of the storage rack 12 is provided with a driven disk 64 and a bearing plate 66, details of the driven disk 64 and the bearing plate 66 being shown in FIGS. 15 and 16. Each support plate 62 has a slot 62a having an opening facing the side along which the scanner 30B moves. The bearing plate 66 has a bottom face provided with a land 66a which is snugly received in the slot 62a of the support plate 62 so that the bearing plate 66 is fixedly mounted on the support plate 62. A bearing bore 66b is formed through the center of the bearing plate 66. A boss 64a protrudes from the upper surface of the driven disk 64 for engaging with the drive shaft of the reel 15B of the cartridge 14, whereas a stud 64b protrudes from the bottom face of the driven disk 64 to be received in the bearing bore 66b.

One cartridge 14 is contained in each support plate 62 of the storage rack 12 by placing the cartridge 14 on the driven disk 64 while the drive shaft of the reel 15B is engaged by the boss 64a of the driven disk 64 and the stud 64b of the driven disk 64 is inserted into the bearing bore 66b of the bearing plate 66.

Figure 17:
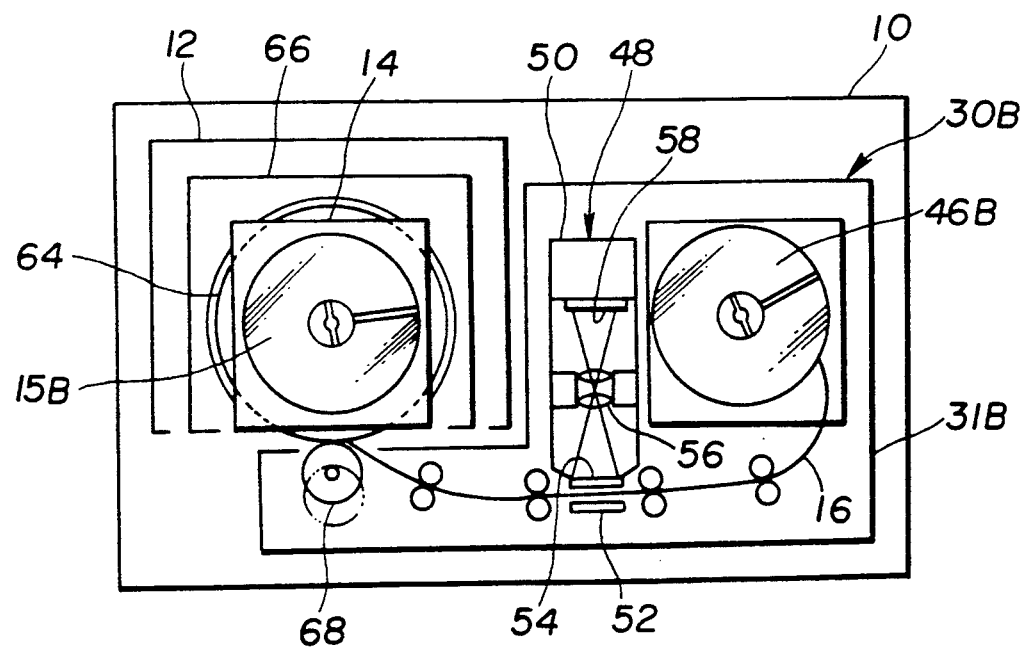
FIG. 17 is a plan view showing the scanner of the fourth embodiment during the target image searching operation.
Figure 18:
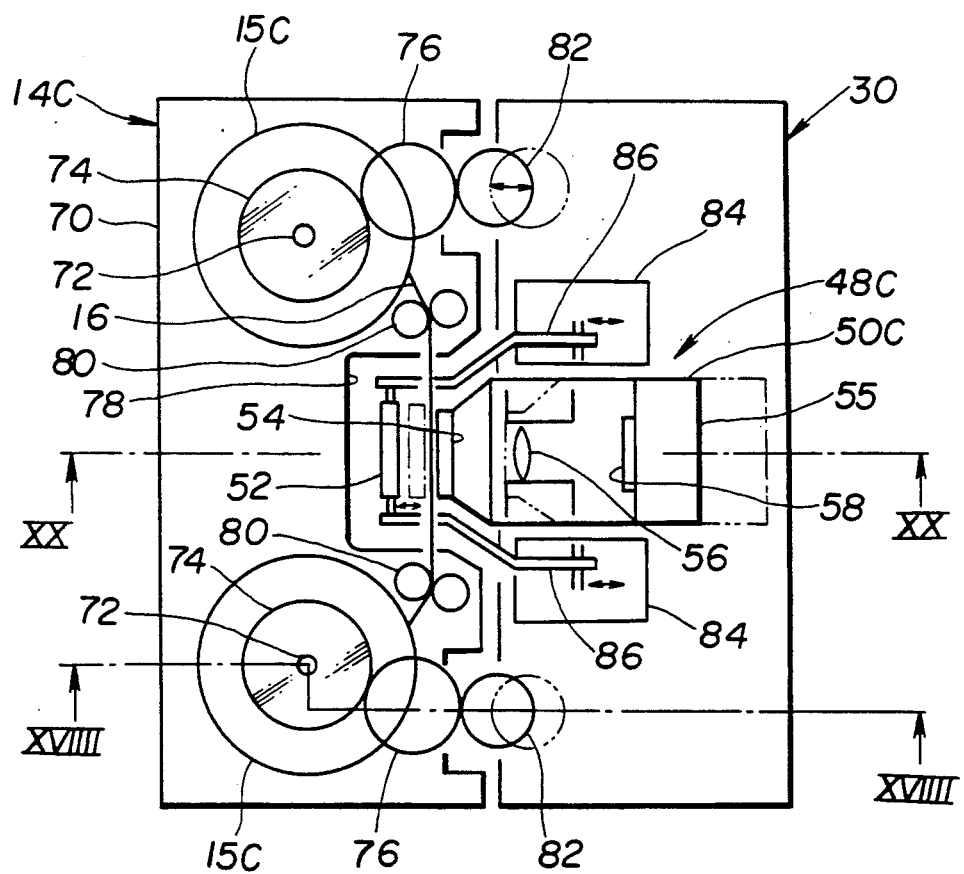
FIG. 18 is a plan view showing the interrelation between the storage rack and the scanner of a fifth embodiment.
Figure 19:
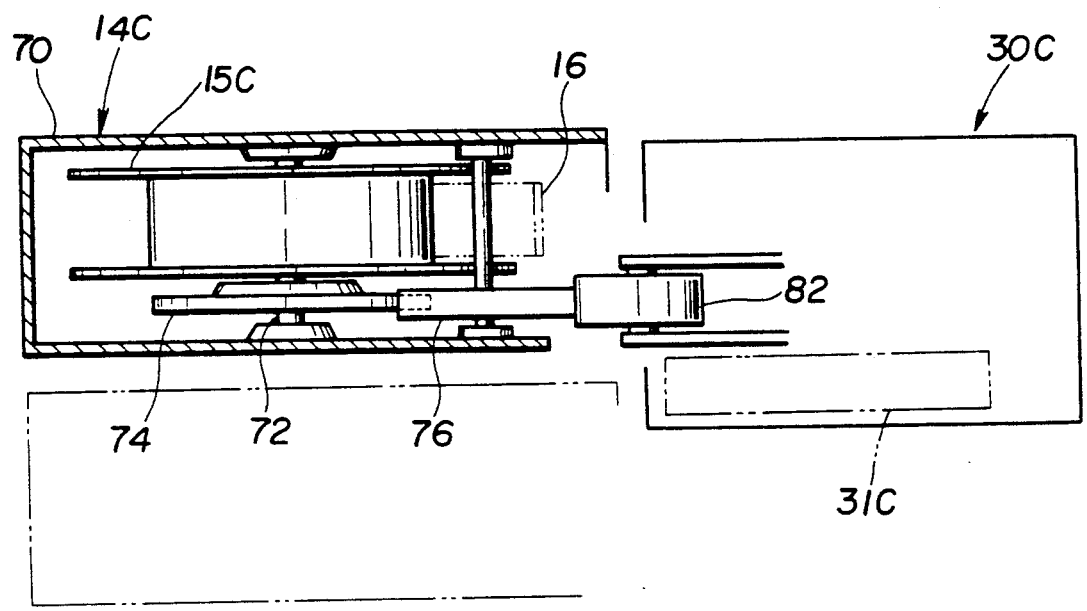
FIG. 19 is a sectional view taken along line XIX—XIX of FIG. 18.

The construction of a scanner 30B used in the fourth embodiment will now be described with reference to FIGS. 15 and 17. The scanner 30B comprises a film driving unit 31B mounted on a mount plate having one side facing to the side wall of the storage rack 12. The mount plate has a leg portion, and the inner edge of the leg portion opposes to the frontal edge of the storage rack 12. The scanner 30B further comprises a take-up reel 46B mounted on the generally square portion of the mount plate, and an image reader 48 disposed on the generally square portion of the mount plate at the position between the take-up reel 46B and the storage rack 12.

A drive roller 68 is mounted near the distal end of the leg portion of the mount plate of the driving unit 31B to be disengageably pressed onto a portion of the driven disk 64 protruding from the frontal edge of the support plate 62. The drive roller 68 is disengaged from the driven disk 64 as the scanner 30B is moved in the vertical direction, and pressed onto the driven disk 64 when the reel 15B is to be rotated.

In operation, the terminal control means 100A supply an instruction, based on the positional information of the selected cartridge 14 stored in the memory 112, to actuate the motor 40 to move the scanner 30B at the position aligned with the selected cartridge 14. Then, upon receipt of a signal from the terminal control means 100A, the drive roller 68 is pressed onto the driven disk 64 so that the reel 15B is rotated. At the same time, the driving unit 31B rotates the take-up reel 46B, and the film 16 is passed through the gap between the EL panel 52 and the glass plate 54 while guided by plural guide roller pairs as shown in FIG. 17. When the target image comes in position between the EL panel 52 and the glass plate 54, the reels 15B and 46B are stopped and the EL panel 52 is moved towards the glass plate 54 so that the film 16 is fixedly sandwiched between the EL panel 52 and the glass plate 54. The target image is read under this condition.

Although it has been described that each support plate 62 extends substantially horizontally, necessary space may be decreased by inclining the support plates 62 from the horizontal orientation. The combination of the driven disk 64 and the drive roller 68 may be replaced by a gear train. The present invention includes all modifications using the presently known driving power transmission mechanisms.

In the fourth embodiment, the selected cartridge 14 need not be transferred from the storage rack 12, since each microfilm cartridge 14 is contained in the support plate 62 of the storage rack 12 with its reel 15B rotatably placed on the driven disk 64 which is rotated by the drive roller 68 of the film driving unit 31B of the scanner. This fourth embodiment is improved over the aforementioned second embodiment in that only the drive roller 68 is pressed onto and separated from the driven disk 64 rather than moving the entire scanner assembly into and out of the storage rack 12. As a result, the access time can be further decreased and the mechanism can be simplified.

Fifth Embodiment

A fifth embodiment of the invention is shown in FIGS. 18 to 21. In the fifth embodiment, driven disks 74, 74 are mounted in each cartridge. Similarly as in the first embodiment, multiple microfilm cartridges 14C are contained one for each of the support plates of the storage rack 12 of the casing 10. As shown FIG. 18, each microfilm cartridge 14C has a pair of reels 15C, 15C around which a microfilm 16 is wound. The reels 15C, 15C are rotatably supported by reel shafts 72, 72 which are mounted to the casing 70 of the microfilm cartridge 14C. Driven disks 74, 74 are integrally formed with the reel shafts 72, 72. The peripheral edges of the driven disks 74, 74 engage with transmission disks 76, 76, as best seen from FIG. 19. The outer peripheral edges, the right-hand side as viewed in FIG. 19, face to the scanner 30C as will be described in detail hereinafter. The casing 70 of the microfilm cartridge 14 has a cut-out 78 at the position between both reels 15C, 15C, and guide roller pairs 80 for guiding the film 16 traverse the cut-out 78 are provided, as best seen from FIG. 18.

The scanner 30C is arranged to move in the vertical direction while facing to the frontal side of the storage rack 12, similar to the scanner 30 of the first embodiment (see FIG. 1).

The construction of the scanner 30C will now be described with reference to FIGS. 18 to 21. The scanner 30C comprises drive rollers 82, 82 which are disengageably pressed onto the transmission disks 76, 76, a driving unit 31C (FIG. 19) which drives the drive rollers 82, 82, and an image reader 48C which is moved into and retracted from the cut-out 78.

Figure 20:
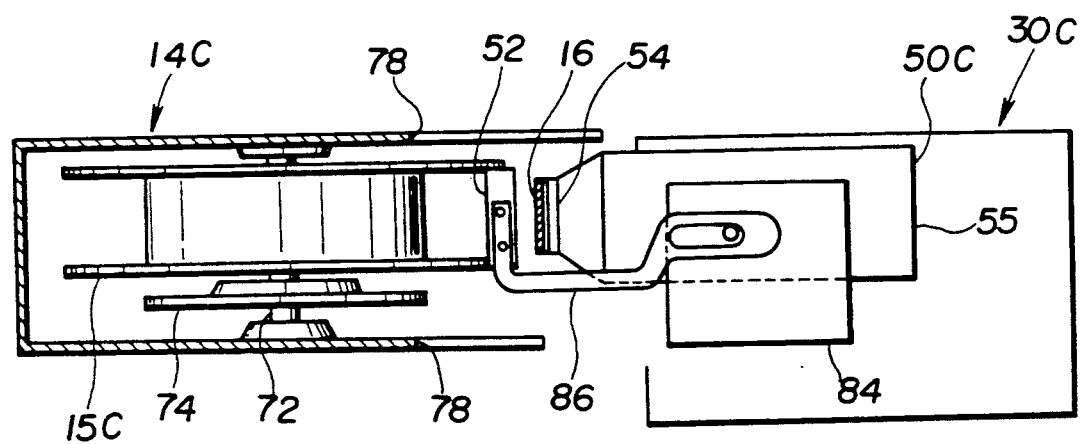
FIG. 20 is a sectional view taken along line XX—XX of FIG. 18.
Figure 21:
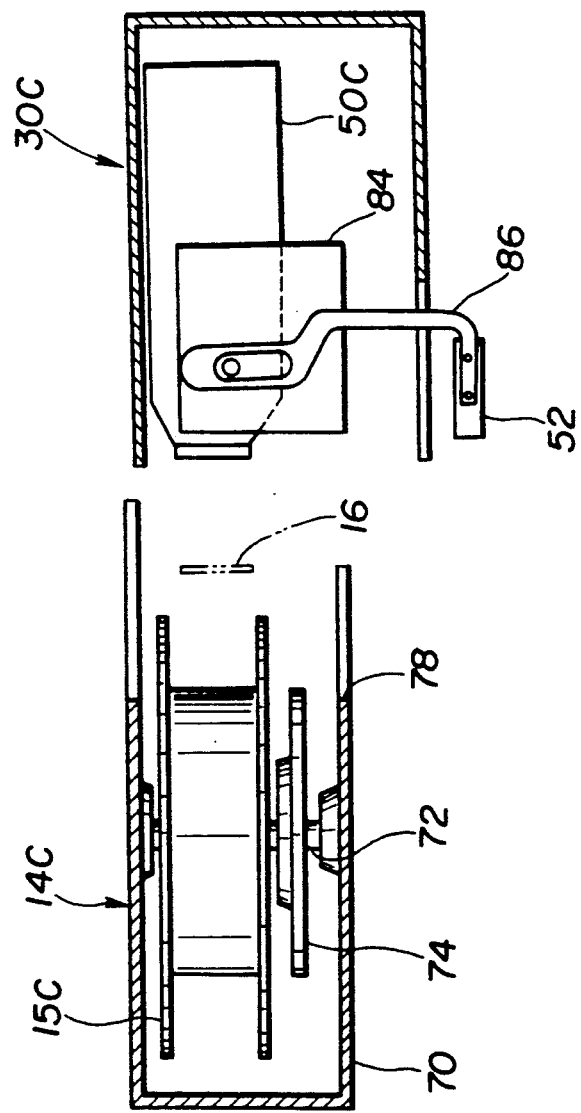
FIG. 21 is a sectional view showing the scanner of the fifth embodiment moving along the verital direction and one support plate of the storage rack facing to the moving scanner.

The image reader 48C comprises a reader unit 50C contained in a sealed housing and an EL panel 52 serving as a light source. The reader unit 50C comprises a glass plate 54 facing to the film 16, a casing 55 forming a sealed housing with the glass plate 54, a projection lens system 56 and an image sensor 58 housed in the sealed housing. The projection lens system 56 is movable along its optical axis, by means of a motor or piezoelectric element, to focus the image on the image sensor 58. The EL panel 52 is mounted between the swinging ends of the arms 86 which are swung by an actuator 84. The arms 86 is also movable in the horizontal direction to move the EL panel 52 horizontally. As the scanner 30C moves in the vertical direction, the arms 86 are swung to the position as shown in FIG. 21 so that the EL panel does not contact with the film 16. When the scanner 30C is moved to the position aligned with the selected microfilm cartridge 14C containing the target image, the arms 86 are swung to the position as shown in FIG. 20 so that the EL panel 52 opposes to the glass plate 54 through the film 16.

As the scanner 30C moves in the vertical direction, the reader unit 50C is held at the retracted position as shown in FIG. 21 so that it is positioned remote from the film 16. When the scanner 30C is moved to the position aligned with the selected microfilm cartridge 14C containing the target image, the reader unit 50C is moved close to the film 16 simultaneously with the swinging movement of the arms 86, so that the film 16 passes through the narrow gap between the EL panel 52 and the glass plate 54. The drive rollers 82, 82 of the scanner 30C are also pushed forwardly to be pressed onto the transmission disks 76 so that the reels 15C, 15C are rotated by the drive rollers 82, 82 through the transmission disks 76, 76, the driven disks 74, 74 and the reel shafts 72, 72, to wind or rewind the film 16. During this winding or rewinding operation, the EL panel 52 is separated from the film 16. When the target image comes in position between the EL panel 52 and the glass plate 54, the EL panel is moved towards the glass plate 54 so that the film 16 is sandwiched between the EL panel 52 and the glass plate 54. The film roll 16 is held under this condition until the image reading operation is completed.

The parts or components of the system of the fifth embodiment, other than the constructions of the scanner 30C and the cartridge 14C, are similar to those of the first embodiment. Accordingly, detailed description of the similar parts or components will be omitted for the simplicity of description.

Although the rotational movements of the drive rollers 82 of the scanner 30C are transmitted through the transmission disks 76 to the driven disks 74 in the fifth embodiment, transmission of the rotational movements may be successfully achieved by the use of a gear train, and it is intended to include such modifications within the scope of this invention. After the target image has been read, the film 16 may be rewound so that the top or a predetermined image frame comes in position between the EL panel 52 and the glass plate 54, or alternatively such rewinding operation may be omitted and the position of the image frame is stored in the memory 112 to further decrease the time required for total operation. Otherwise, in a modified embodiment, the film 16 is completely rewound so that one of the reels 15C is empty and no film exits at the frontal side of the storage rack 12 to prevent the film 16 from obstructing the movement of the EL panel 52 during the operation of moving the scanner 30C in the vertical direction to eliminate the necessity of swinging movement of the EL panel 52.

Although the driven disks 74 are rotated by the drive rollers 82 through the transmission disks 76 in the fifth embodiment, the transmission disks 76 may be dispensed and the driven disks 74 may be directly driven by the drive rollers 82.

As has been described above, in the fifth embodiment, driven disks 74 are mounted to the casing 70 of each microfilm cartridge 14C and they are driven by the drive rollers 82 of the scanner 30C through the transmission disks 76. Accordingly the fifth embodiment has advantages similar to those of the fourth embodiment in that only the drive rollers 82 are pressed onto and separated from the transmission disks 76 rather than moving the entire scanner assembly into and out of the storage rack 12, and in that the access time can be further decreased.

Sixth Embodiment

A sixth embodiment will now be described with reference to FIGS. 22 to 27. In the sixth embodiment, microfilms are wound around reels which are contained in a storage rack 12 in a closely packed condition.

Figure 22:
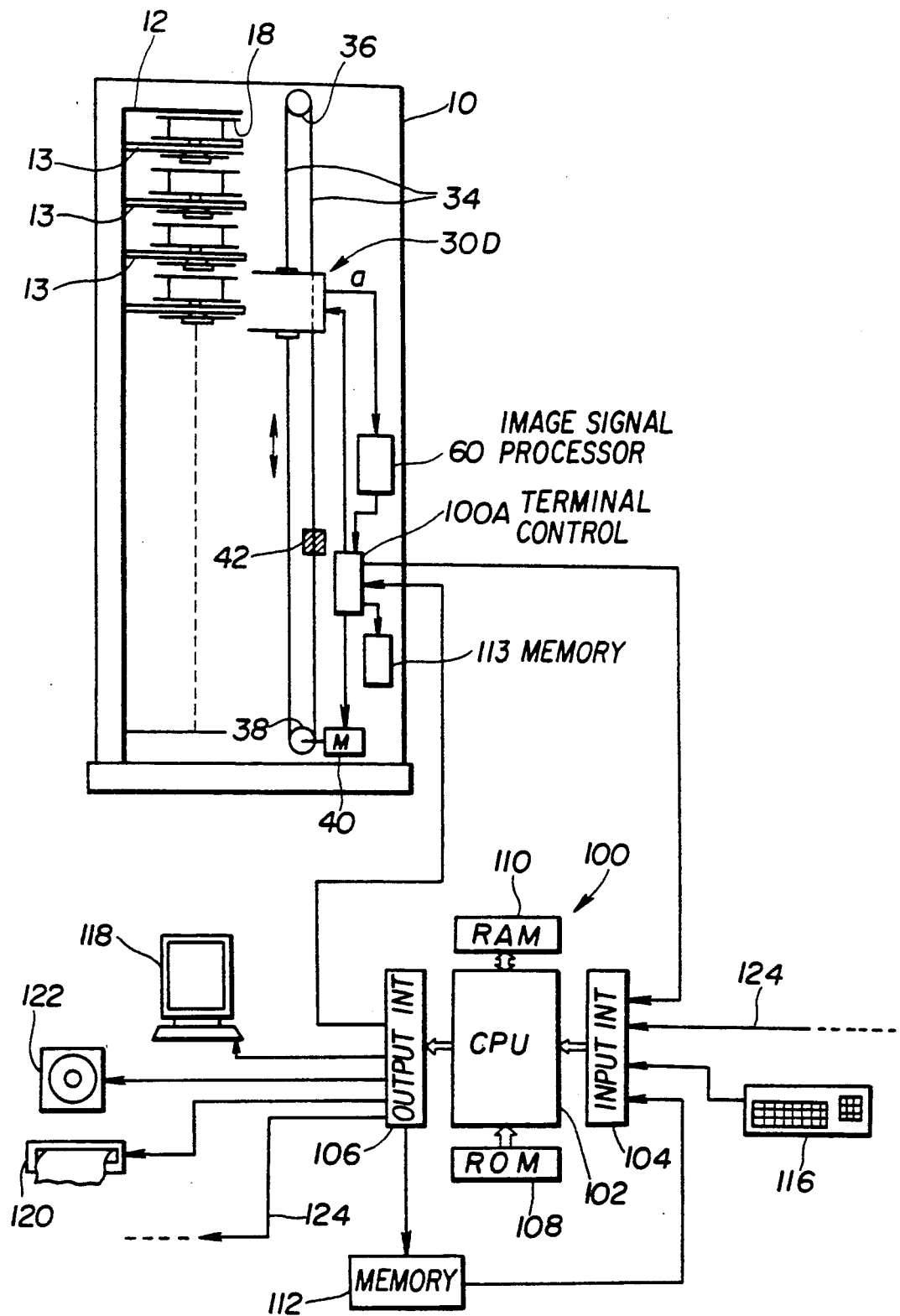
FIG. 22 is a schematic illustration showing a system in which a sixth embodiment of the invention is incorporated.

Initially referring to FIG. 22, multiple support plates 13 are arranged in the vertical direction one above another in a storage rack 12 disposed at one side of a casing 10 having a generally rectangular cross section. As best seen from FIG. 23, a pair of rotary shaft 88a and 88b are rotatably supported by each support plate 13. The rotary shafts 88a and 88b have upper protruding ends to which reels 90a and 90b are secured. The lower ends of the rotary shafts 88a and 88b protruding through the support plate 13 are attached with driven disks 92a and 92b which are integrally rotated with the rotary shafts 88a and 88b and the reels 90a and 90b. A microfilm roll 16 is wound around the reels 90a and 90b.

Figure 23:
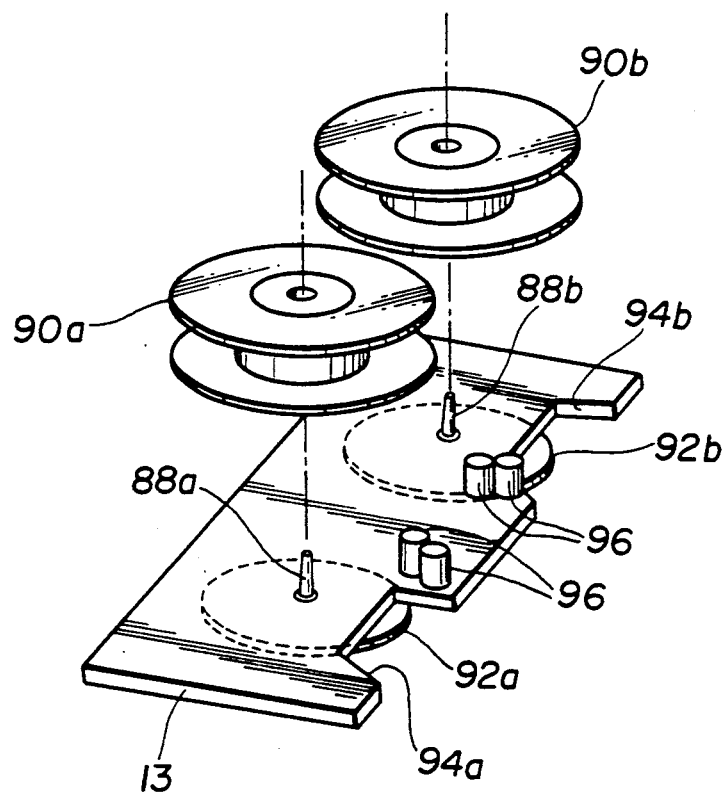
FIG. 23 is an exploded perspective view showing one support plate of the storage rack of the sixth embodiment and also showing reels to be supported on the support plate.

The frontal side of the support plate 13 facing to a scanner 30D, which will be described in detail hereinafter, is cut away to form two cut-out portions 94a and 94b. Guide roller pairs 96 are provided on the support plate 13 to guide the film 16, as shown in FIG. 23.

The scanner 30D moves in the vertical direction while facing to the frontal side of the storage rack 12. The mechanism for moving the scanner 30D is the same as used in the first embodiment and illustrated in FIG. 1.

Figure 27:
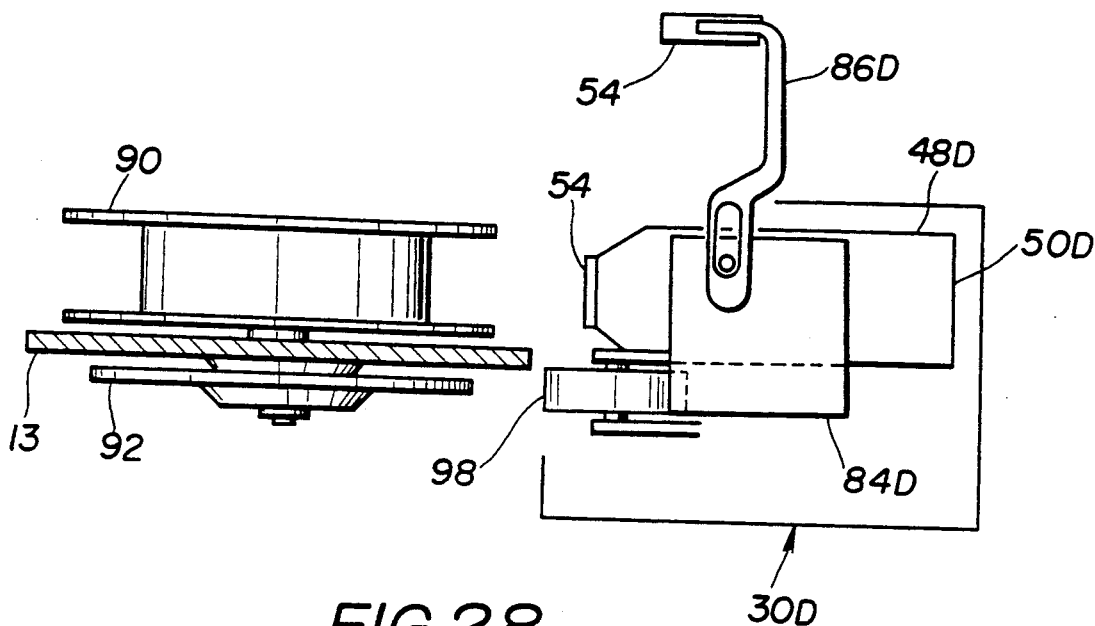
FIG. 27 is a sectional view showing the scanner of the sixth embodiment moving along the verital direction and one support plate of the storage rack facing to the moving scanner.

The construction of the scanner 30D is shown in FIGS. 23 to 27, and approximately similar to that of the scanner 30C used in the fifth embodiment. Namely, the scanner 30D comprises a drive unit 31D (FIG. 25) having drive rollers 98a and 98b disengageably pressed onto the disks 92a and 92b, respectively, to wind and rewind the film 16. The scanner 30D further comprises an image reader 48D moved close to and remote from the reels 90a and 90b. The image reader 48D includes a reader unit 50D contained in a sealed housing, and an EL panel 52 serving as a light source. The reader unit 50D comprises a glass plate 54 facing to the film 16, a casing 55 forming a sealed housing with the glass plate 54, a projection lens system 56 and an image sensor 58 housed in the sealed housing. The EL panel 52 is mounted between the swinging ends of arms 86D which are swung by an actuator 84D. The arms 86D are also movable in the horizontal direction. As the scanner 30D moved in the vertical direction, the arms 86D are swung upwardly to prevent the EL panel 52 from contacting with the film 16, while the reader unit 50D and the drive rollers 98 being held in the retracted position, as shown in FIG. 27. When the scanner 30D is moved to the position aligned with the reel 90 containing the target image, the reader unit 50D is moved close to the film 16 and the arms 86D are swung so that the El panel 52 opposes to the glass plate 54 while allowing the film 16 to pass through the gap between the EL panel 52 and the glass plate 54. The drive rollers 98 of the scanner 30D are moved to be pressed onto the driven disks 92 and rotated by the film driving unit 31D, whereupon the reels 90 are rotated by the drive rollers 98 through the driven disks 92 and the rotary shafts 88 so that the film 16 is wound or rewound. During this winding or rewinding operation, the EL panel 52 is separated from the film 16. When the target image comes in position, the EL panel 52 is moved by an actuator 84D towards the glass plate 52 so that the film 16 is fixedly sandwiched between the EL panel 52 and the glass plate 54. The film 16 is held in this condition until the target image has been read thoroughly.

The construction of the sixth embodiment except the parts or components described above is similar to those of the first and fifth embodiments, and the positional data relating to the reels 90 contained in respective support plates 13 are stored in the memory means 112.

Although the drive rollers 98 of the scanner 30D are pressed onto the driven disks 92 attached to the selected reel 90 to transmit frictionally the rotational movement, transmission of rotational movement may be achieved by the use of a gear train within the scope of the present invention. After the target image has been read and before the scanner is moved to the position aligned with the next selected reel, the film 16 may be rewound so that the top or a predetermined image frame comes in position between the EL panel 52 and the glass plate 54. However, the film 16 may be left unrewound and the position of the image frame is stored in the memory means 112 to further decrease the time required for total operation. The position of the image frame may be discriminated, for example, by attaching marks indicating the positional data of respective image frames and by sensing the marks by a sensor.

Figure 24:
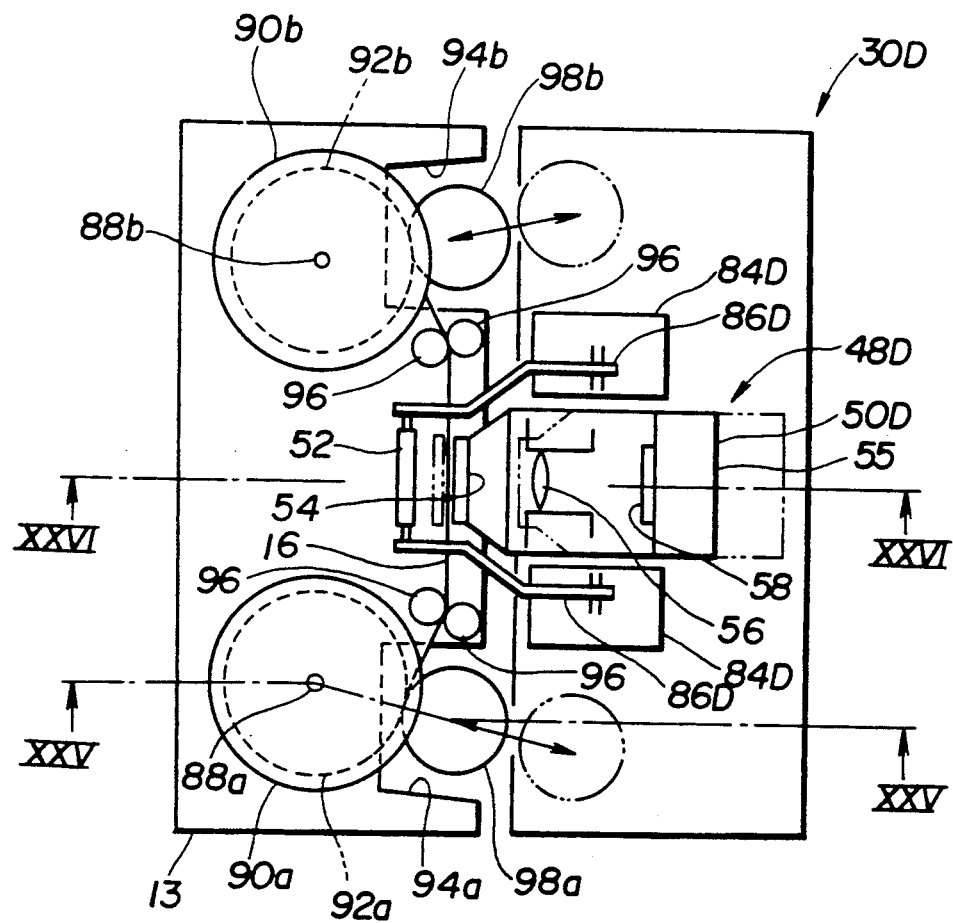
FIG. 24 is a plan view showing the interrelation between the storage rack and the scanner of the sixth embodiment.
Figure 25:
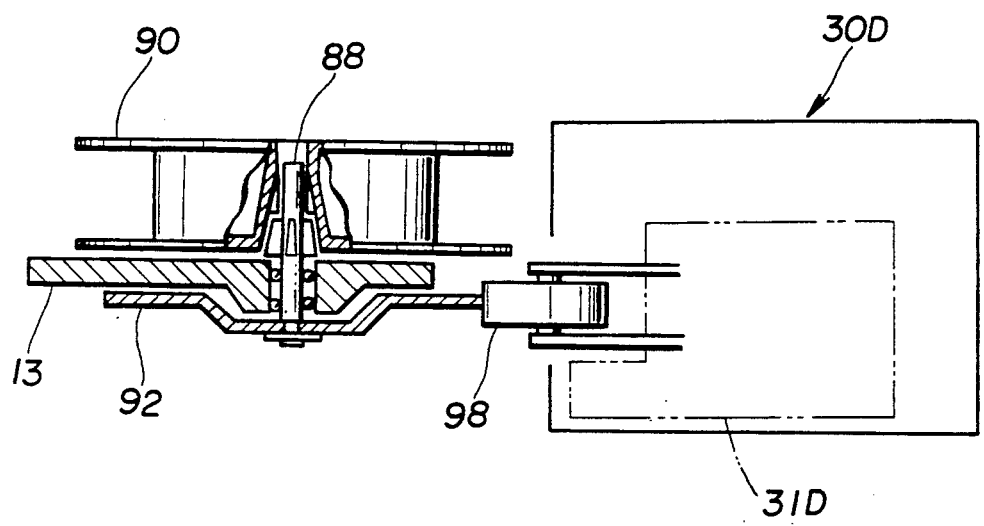
FIG. 25 is a sectional view taken along line XXV—XXV of FIG. 24.
Figure 26:
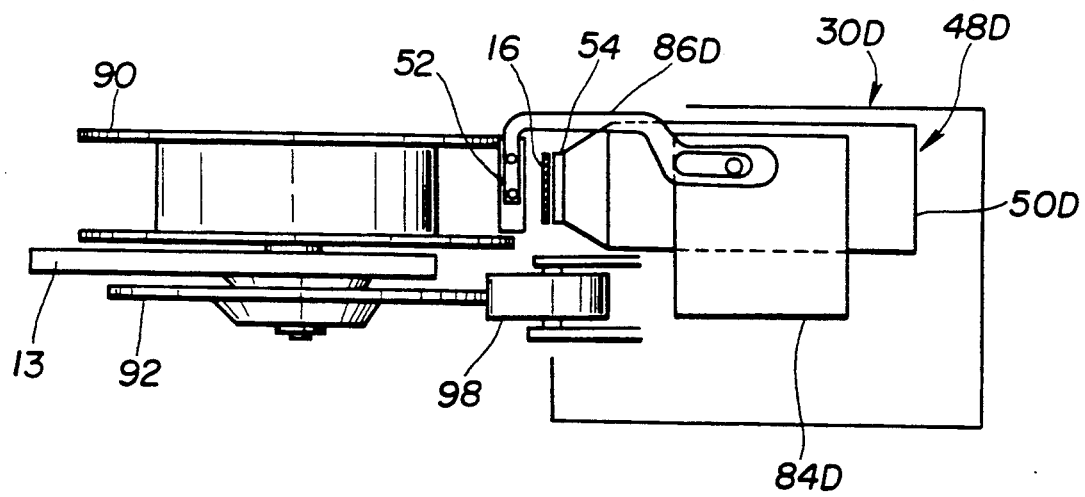
FIG. 26 is a sectional view taken along line XXVI—XXVI of FIG. 24.
Figure 28:
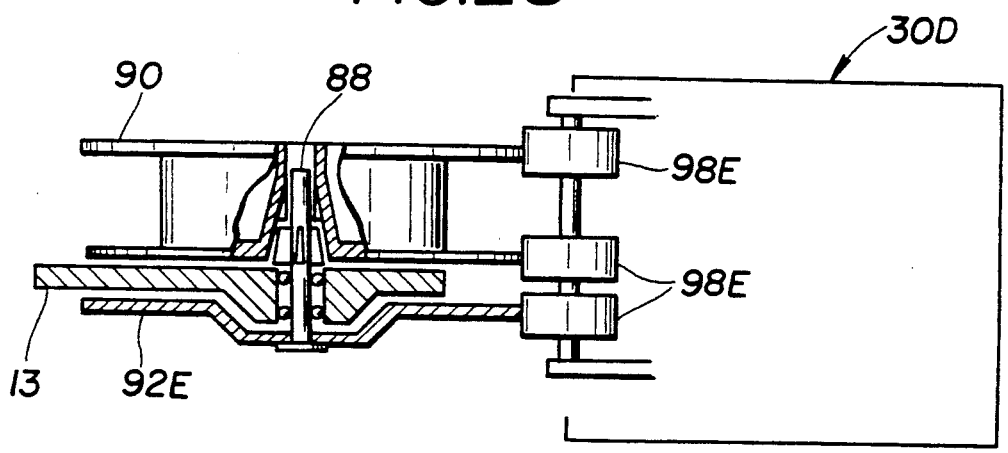
FIGS. 28 and 29 are sectional views similar to FIG. 25 but showing different embodiments.
Figure 29:
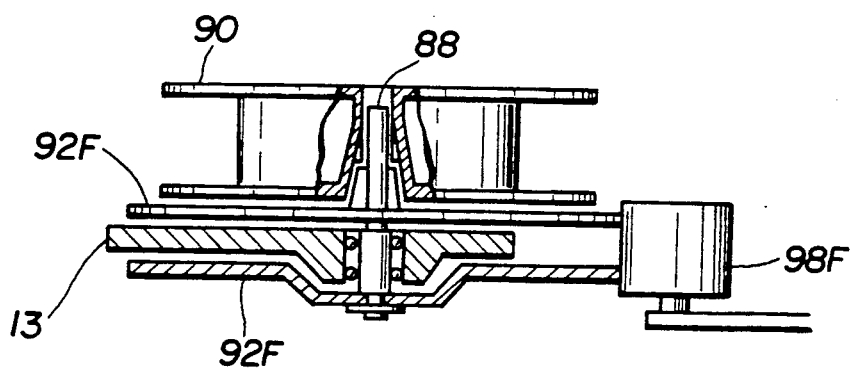

FIGS. 28 and 29 are sectional views of modified embodiments of the sixth embodiment taken along a line corresponding to the line XXV—XXV of FIG. 24. In the embodiment shown in FIG.—25 (the sixth embodiment), the drive rollers 98 are pressed onto the driven disks 92 so that the lower end of the rotary shaft 88 is biased in the horizontal direction by an appreciable force. As a result, there is a problem in durability of the bearing. In the modified embodiment shown in FIG. 28, the top and bottom plates 90 of the reel have the same diameters as that of each driven disk 92E, and drive rollers 98E are pressed onto the peripheral edges of the plates 90 and the driven disk 2E. In the embodiment shown in FIG. 29, driven disks 92F, 92F having the same diameter are disposed above and below the support plate 13 so that drive rollers 98F are pressed onto both driven disks 92F and 92F. With the construction of either one of these modified embodiments, the rotary shaft 88 is prevented from being applied with a tilting moment to avoid damage of the bearing.

Either one of the reels 90a and 90b may be dispensed, and a take-up reel may be provided in the scanner assembly.

According to the sixth embodiment, since each support plate has the rotary shafts, the driven disks and reels, the reels need not be contained in cartridges to save the space and compactmization of the rack and close containment of the reels can be realized. Since delivery of reels is not necessary, the access time for reading the target image can also be decreased.

Seventh Embodiment

The seventh embodiment of the invention will now be described with reference to FIGS. 30 to 36.

Figure 30:
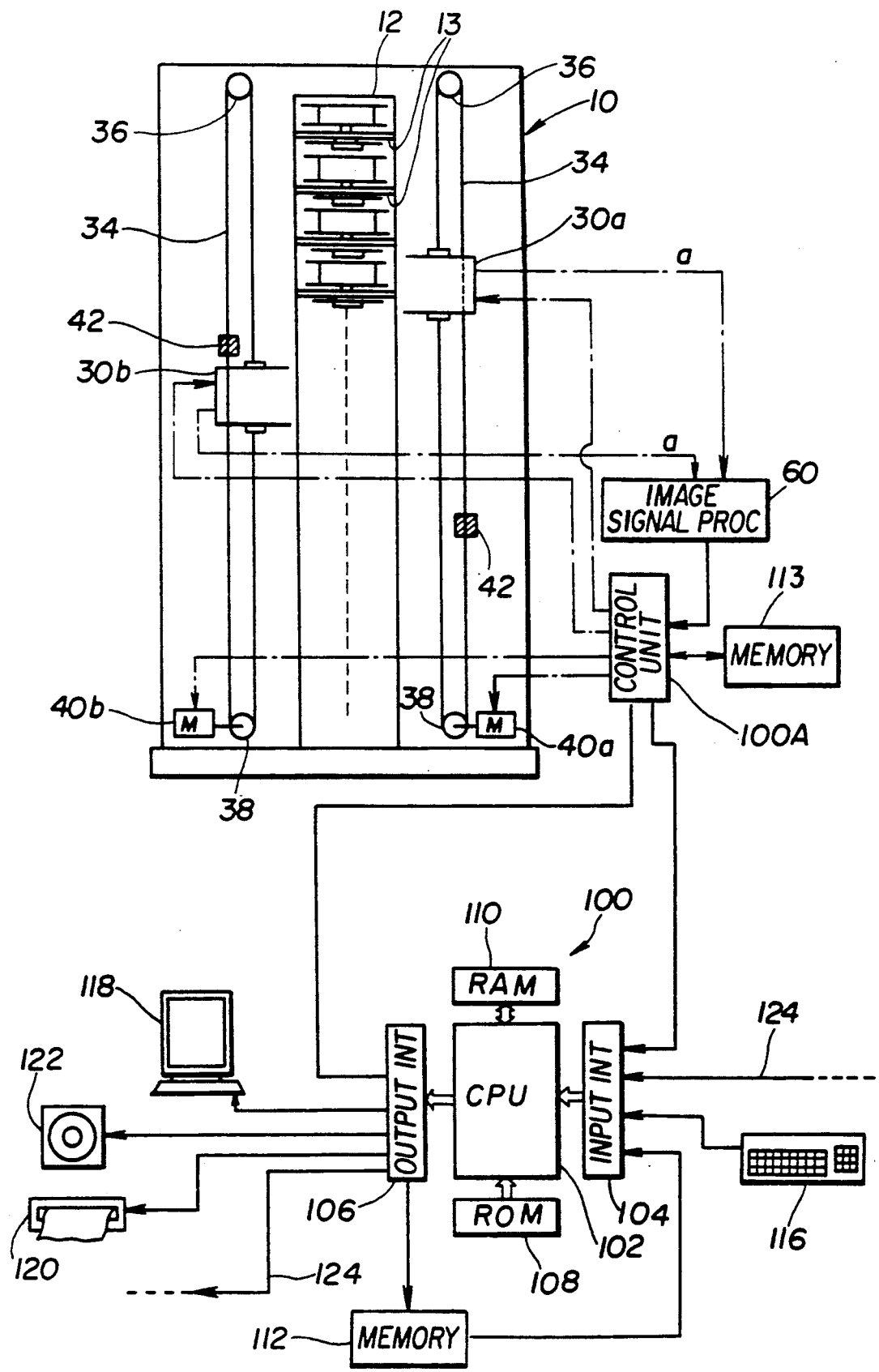
FIG. 30 is a schematic illustration showing a system in which a seventh embodiment of the invention is incorporated.

As shown in FIG. 30, multiple support plates 13 are arranged in the vertical direction one above another in a storage rack 12 assembled in a casing 10 having a generally rectangular cross section.

Likewise to the sixth embodiment, each support plate 13 has a pair of rotary shafts 88a and 88b each having an upper projecting end to which a reel 90 (90a, 90b) is rotatably secured. Each rotary shaft 88 has a lower projecting end to which a driven disk 92 (92a, 92b) is mounted. The driven disk 92, the rotary shaft 88 and the reel 90 are integrally united to be rotated together. A microfilm roll 16 is wound around the reel 90.

Figure 31:
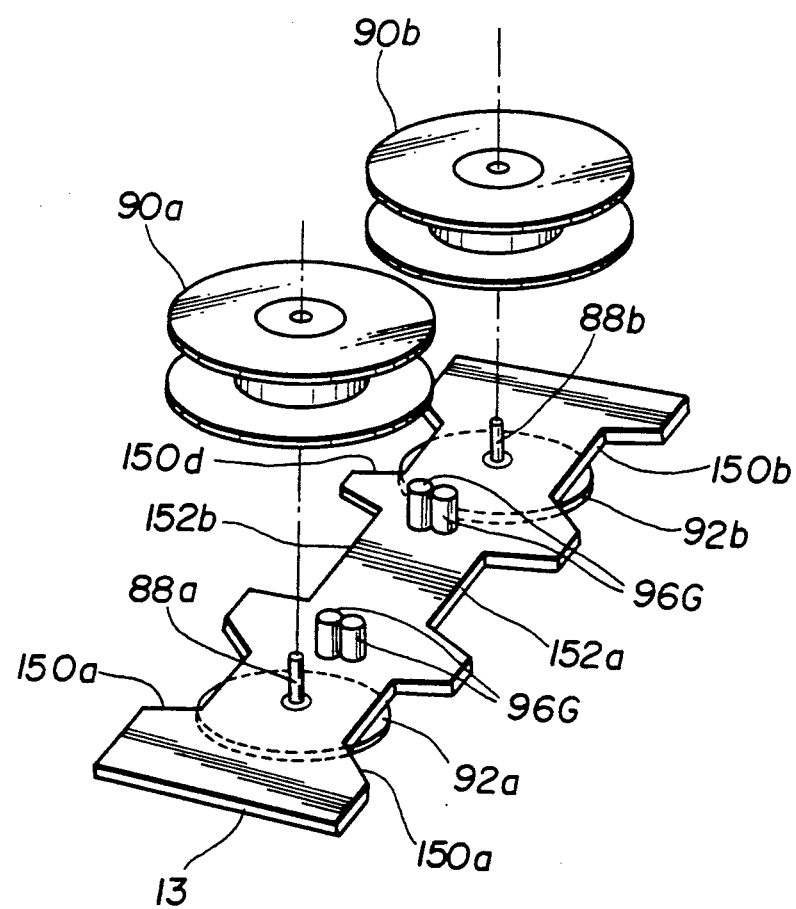
FIG. 31 is an exploded perspective view showing one support plate of the storage rack of the seventh embodiment and also showing reels to be supported on the support plate.
Figure 32:
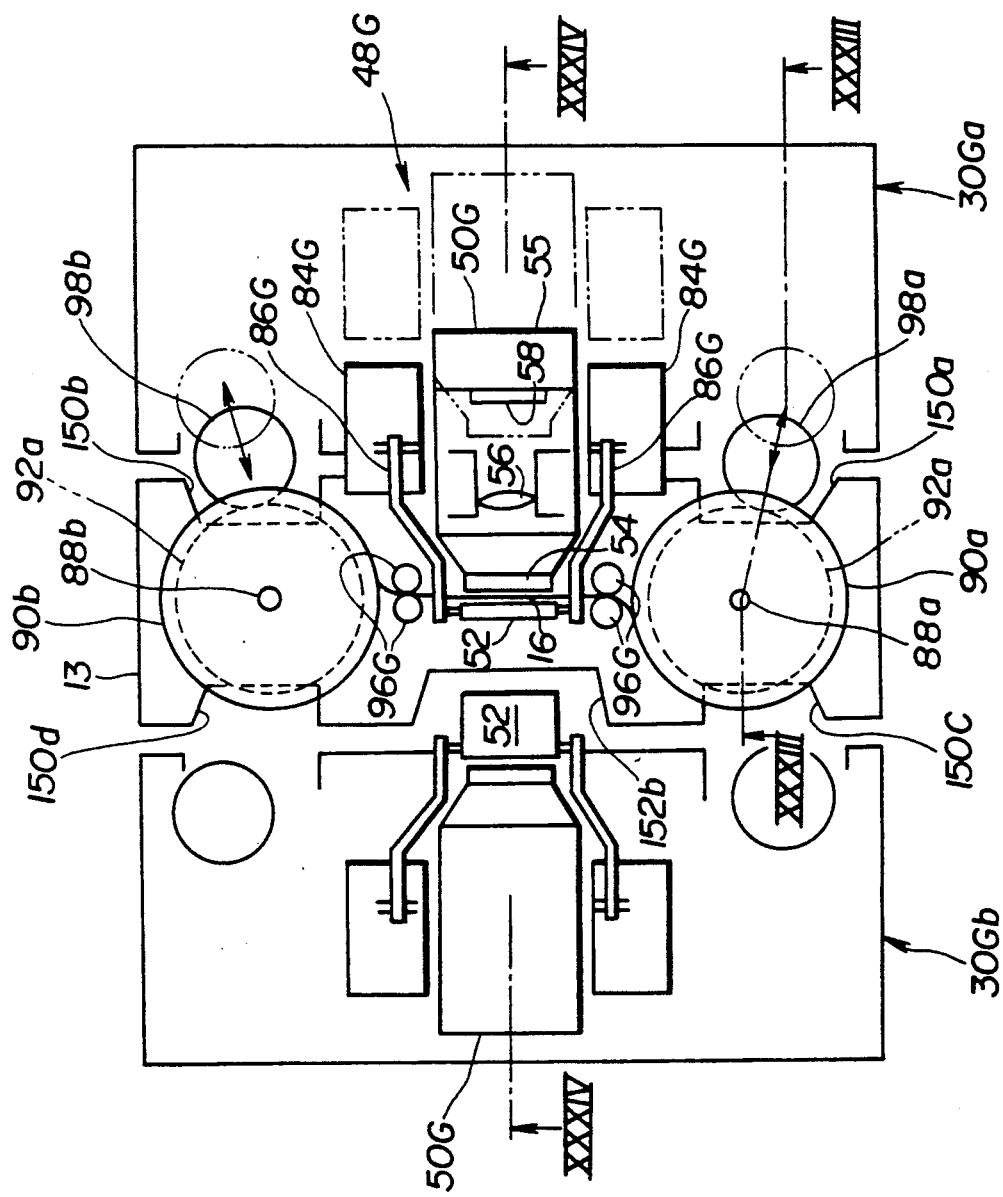
FIG. 32 is a plan view showing the interrelation between the storage rack and the scanner of the seventh embodiment.
Figure 33:
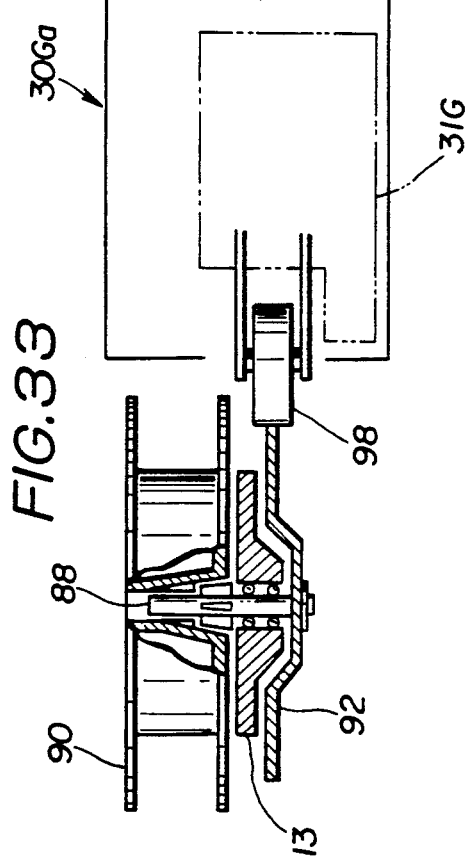
FIG. 33 is a sectional view taken along line XXXIII—XXXIII of FIG. 32.
Figure 34:
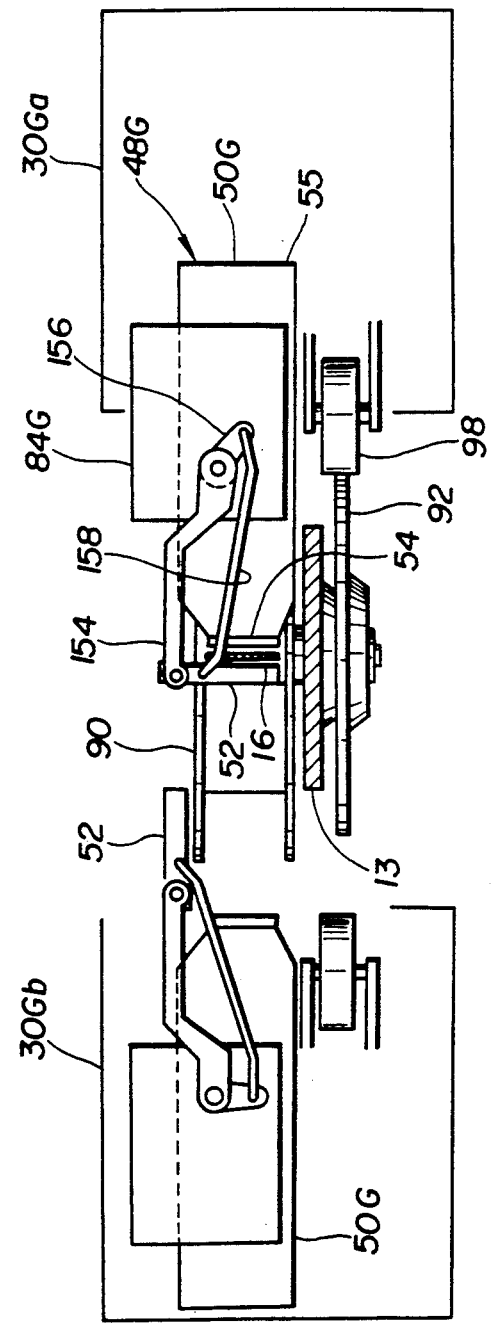
FIG. 34 is a sectional view taken along line XXXIV—XXXIV of FIG. 32.
Figure 35:
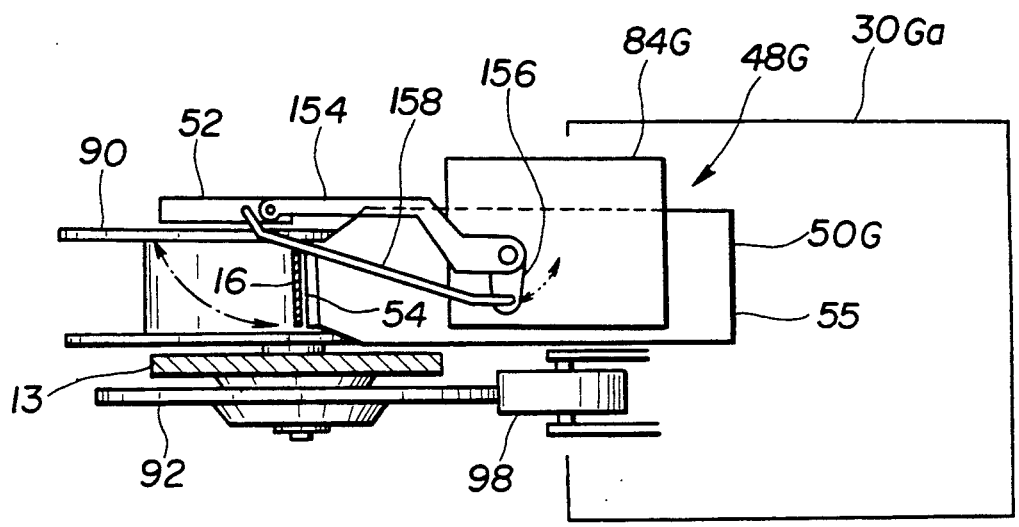
FIG. 35 is a schematic illustration showing the image reader moving in and retracted from the storage rack.

As best seen from FIG. 31, each support plate 13 is provided with two side pairs of cut-outs 150a to 150e. A center pair of cut-outs 152f and 152g is further provided at both sides of the support plate 13. Guide roller pairs 96G are mounted on the support plate 13 so that the film 16 is guided through the path extending along the line from the rotary shaft 88a to the rotary shaft 88b as seen from FIG. 32.

Two scanners 30G are assembled in the seventh embodiment. These scanners 30Ga and 30Gb move independently along the vertical direction while facing to both sides of the storage rack 12 as seen from FIG. 30. Each scanner 30G is guided by a guide rail and moved by a paired wires 34, 34, similarly as in the first and sixth embodiments. Each wire runs around an upper pully 36 and a lower pulley 38 and has its ends fixed to the top and bottom faces of the scanner 30G. The lower pulleys 38, 38 are rotated by servo motors 40a and 40b so that respective scanners 30G are moved independently in the vertical direction.

Since the scanners 30G have the constructions symmetrical with each other, one of the scanner (scanner 30Ga) will be described in detail. The scanner 30Ga include drive rollers 98 (98a, 98b) to be pressed onto and separated from the driven disks 92a, 92b, a drive unit 31G (see FIG. 33) for rotating the drive rollers 98a, 98b, and an image reader 48G which is movable close to and remote from the reels 90.

The image reader 48G comprises a reader unit 50G contained in a sealed housing, and an EL panel 52 serving as a light source. The reader unit 50G is moved close to an remote from the film 16 by means of a servo motor or like, and has a construction substantially identical with the reader unit 50D used in the sixth embodiment. The EL panel 52 is mounted between the distal ends of swingable arms 154 which are swung by actuators 84G. The actuators 84G are mounted on both sides of a casing 55 for sealingly containing therein the reader unit 50G, and moved together with the casing 55. As seen from FIGS. 34 to 36, a lever 156 is mounted to each actuator 84G, and the swing end of the lever 156 is connected to a link 158 which supports the EL panel 52. As the lever 156 swings, the EL panel 52 is swung between the vertical position and the horizontal position.

Figure 36:
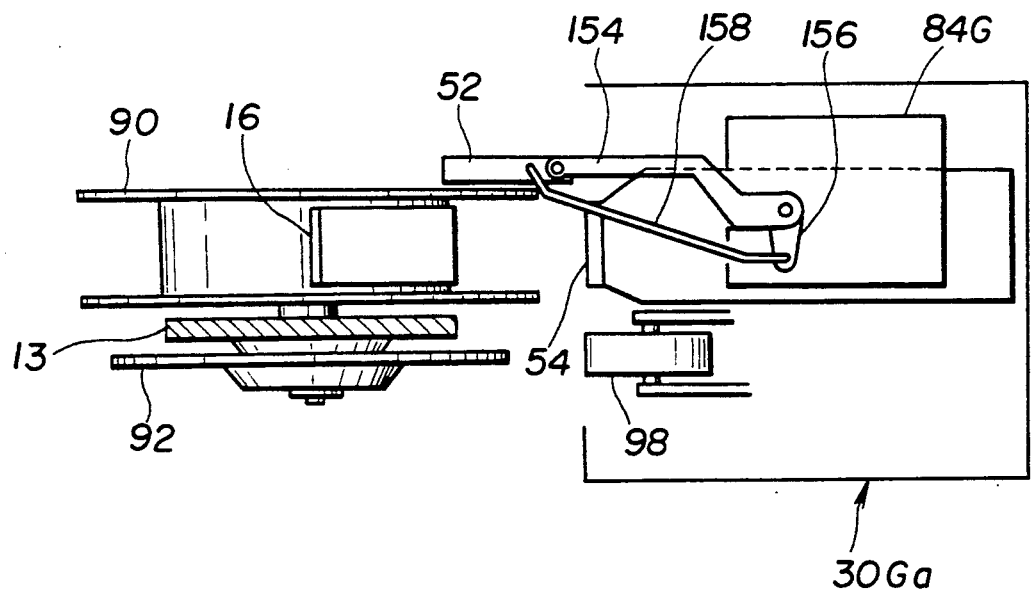
FIG. 36 shows the scanner in its position for moving along the vertical direction.

As the scanner 30G travels along the vertical direction, the El panel 52 is swung to the horizontal position so that it is prevented from contacting with the film 16 and the EL panel 52, and the reader unit 50G and the drive rollers 98 are retracted to the positions remote from the film 16 as shown in FIG. 36. The scanner 30G is moved in the vertical direction under this condition. The EL panel 52 passes through the cut-out 152 of the support plate 13.

When the scanner 30G comes to the position aligned with the selected reel 90, the reader unit 50G and the EL panel 52 is moved close to the film 16 and the El panel 52 is swung downwardly so that the EL panel 52 comes to the position opposite to the glass plate 54 while leaving a gap therebetween for passing the film 16. The drive roller 98 are simultaneously moved until they engage with the driven disks 92. Upon actuation of the reel drive unit 31G, the drive rollers 98 are rotated so that the reels 90 are rotated through the driven disks 92 and the rotary shafts 88 to wind or rewind the film 16. During this winding or rewinding operation, the EL panel 52 is separated from the film 16. When the target image frame comes in position between the EL panel 52 and the glass plate 54, the El panel 2 moved towards the glass plate 54 by the actuation of the actuator 84G so that the film 16 is fixedly sandwiched between the EL panel 52 and the glass plate 54. The EL panel 52 serves as a light source to project the target image on the film 16 through the glass plate 54 and the lens system 56 so that the projected image is led to an image sensor 58.

As described hereinbefore, two scanners 30G are disposed to move along the opposite sides of the storage rack 12 and controlled independently with each other. With this construction, while one of the two scanners 30G read a certain image, the other scanner is moved along the vertical direction or operated to achieve necessary action to be ready for the next image reading operation. Thus, the access time can be considerably decreased by the provision of the two scanners 30G facing to the opposite sides of the storage rack 12. It is also possible to memory temporarily the image data read by one of the scanners 30G and then the stored image data are read in the reverse sequence to reverse the same so that the reversed image data are brought to identical with those read by the other scanner 30G.

The time series image signals a fed from the image sensor 58 are put through an image processing circuit 60 to a terminal control means 100A and a central control means 100 to be utilized as image data.

Since the other parts or components of the seventh embodiment are similar to those of the first to sixth embodiments, the detailed constructions and operations will not be repeatedly described here. However, it is to be noted that reels 90 are not contained in cartridges and placed directly on respective support plates 13 of the storage rack 12 likewise in the sixth embodiment, and that the data relating to the contents and positions of respective reels 90 are stored in the memory means 112 or the memory 113 of the terminal control means 100A.

Although it has been described that the rotational movements of the drive rollers 42 of the scanners 30G are frictionally transmitted to the driven disks 92 of the reels 90 in the illustrated embodiment, transmission of rotational movement may be effected by the use of a gear train. After the completion of reading the target image, the film 16 may be rewound so that the top or a predetermined image frame comes in position between the EL panel 52 and the glass plate 54 before the scanner 30G is moved to the position aligned with the reel 90 containing the next target image. However, such a rewinding operation may be omitted and the position of the image frame is stored in the memory 112 to further decrease the time required for total operation. In such a case, the position of the film frame may be discriminated by reading the marks attached to the film 16.

Figure 37:
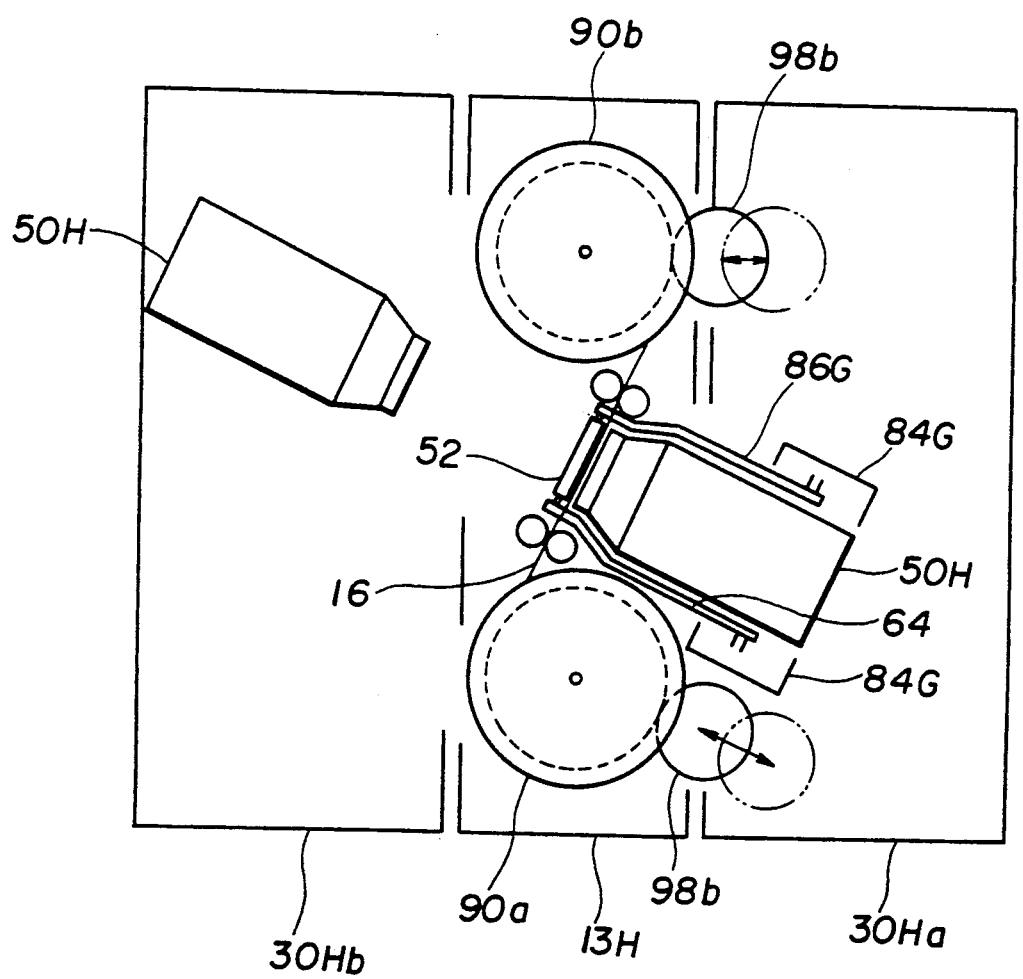
FIG. 37 shows a plan view of the scanner.
Figure 38:
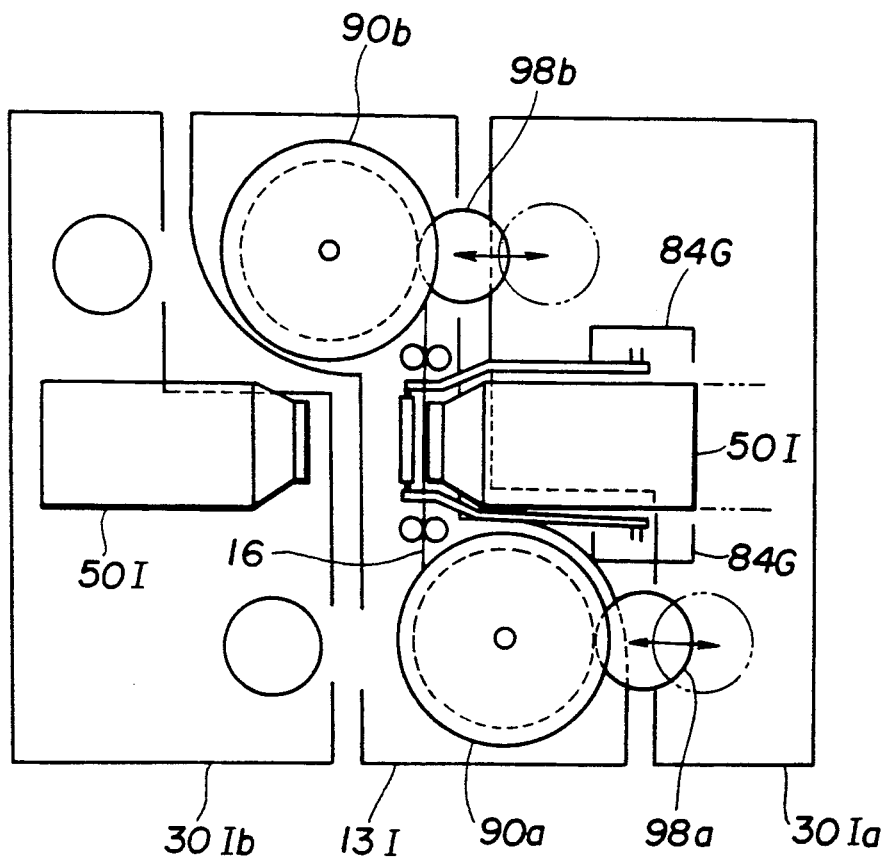

Modified layouts of the seventh embodiment are shown in FIGS. 37 and 38. In the modified embodiment shown in FIG. 37, reels 90a and 90b mounted on a support plate 13H are rotated in the reverse directions, and the film 16 runs obliquely relative to the longitudinal sides of the support plate 13H. An image reader 50H of each scanner 30H (30Ha, 30Hb) is moved along the direction perpendicular to the running path of the film 16 to be close to or remote from the film 16.

The modified embodiment shown in FIG. 38 is principally the same as the modified embodiment shown in FIG. 37. However, in the modified embodiment shown in FIG. 38, the film 16 runs through the path which is parallel to the longitudinal sides of a support plate 13I and also parallel to the frontal faces of the scanners 30Ia and 30Ib. The image reader 50I of each scanner 30I is moved along the direction perpendicular to the running path of the film 16 to be close to or remote from the film 16.

Two scanners are disposed at the opposite sides of the storage rack to be moved independently with each other, and the image data read by either one of the scanners can be reversed in this seventh embodiment. Accordingly, as one of the two scanners is used to read a certain target image, the other scanner may be operated to complete the operation to be ready for next image reading operation. Thus, the access time can be considerably decreased. The size of the storage rack is decreased to reduce the space required for installation of the system. The seventh embodiment can be readily adapted for change in system scale only by increasing or decreasing the number of the assembled casings.

What is claimed is:

1. A microfilm searching and reading device for selecting a microfilm cartridge containing a reel around which a microfilm roll having a target image is wound from multiple microfilm cartridges and for reading the target image to produce image data, comprising:

a storage rack having multiple support plates on which said microfilm cartridges are stored, said support plates being arranged along the vertical direction one above another;

a scanner facing said storage rack to move along the vertical direction and including an image reader, a driving unit for winding and rewinding the microfilm roll contained in said selected microfilm cartridge and a take-up reel for taking up the microfilm roll contained in said selected microfilm cartridge;

ejector means mounted on respective support plates for transferring said selected cartridge to said scanner;

memory means for storing the positional data of respective microfilm cartridges; and control means for producing instructions to allow said scanner to move the position facing said selected microfilm cartridge and to allow said image reader to read said target image.

2. The microfilm searching and reading device according to claim 1, wherein each of said ejector means is a belt mechanism which applies a biasing force to push out said selected microfilm cartridge.

3. A microfilm searching and reading device for selecting a microfilm cartridge containing a target image from multiple microfilm cartridges and for reading the target image to produce image data, comprising:

a storage rack having multiple support plates on which said microfilm cartridges are stored, said support plates being arranged along the vertical direction one above another;

a scanner facing to said storage rack to move along the vertical direction and also to move into and retract from said storage rack, said scanner including an image reader and a driving unit for winding and rewinding the microfilm roll contained in said selected microfilm cartridge;

memory means for storing the positional data of respective microfilm cartridges; and control means for producing instructions to allow said scanner to move to the position facing to said selected microfilm cartridge and to allow said image reader to read said target image.

4. A microfilm searching and reading device for selecting a microfilm cartridge containing a target image from multiple microfilm cartridges and for reading the target image to produce image data, comprising:

a storage rack for storing multiple microfilm cartridges, said microfilm cartridges having driven shafts and being stacked one above another in an inclined posture relative to the vertical direction with said driven shafts uncovered by adjacent cartridges;

a scanner facing said storage rack to move along the vertical direction and including an image reader and a driving unit for winding and rewinding the microfilm roll contained in said selected microfilm cartridge, said driving unit having a drive shaft removably engaging with said driven shaft of said selected microfilm cartridge to wind and rewind the microfilm roll contained in said selected microfilm cartridge;

memory means for storing the positional data of respective microfilm cartridges; and control means for producing instructions to allow said scanner to move to the position facing to said selected microfilm cartridge and to allow said image reader to read said target image.

5. A microfilm searching and reading device for selecting a microfilm cartridge containing a target image from multiple microfilm cartridges and for reading the target image to produce image data, comprising:

a storage rack having multiple support plates on which microfilm cartridges are stored, said support plates being arranged along the vertical direction one above another, each of said support plates having a driven disk for engaging with the reel of the microfilm cartridge stored on each support plate;

a scanner facing said storage rack to move along the vertical direction and including an image reader and a driving unit for winding and rewinding the microfilm roll contained in said selected microfilm cartridge, said driving unit comprising a drive roller detachably engaging with said driven disk;

memory means for storing the positional data of respective microfilm cartridges; and control means for producing instructions to allow said scanner to move to the position facing said selected microfilm cartridge and to allow said image reader to read said target image.

6. A microfilm searching and reading device for selecting a microfilm cartridge containing a target image from multiple microfilm cartridges and for reading the target image to produce image data, said microfilm cartridge having a pair of reels, comprising:

a driven disk integrated in said microfilm cartridge and engaging with each of said reels;

a storage rack having multiple support plates on which microfilm cartridges are stored, said support plates being arranged along the vertical direction one above another;

a scanner facing to said storage rack to move along the vertical direction and including an image reader and a driving unit for winding and rewinding the microfilm roll contained in said selected microfilm cartridge, said driving unit comprising a drive roller detachably engaging with said driven disk;

memory means for storing the positional data of respective microfilm cartridges; and control means for producing instructions to allow said scanner to move to the position facing to said selected microfilm cartridge and to allow said image reader to read said target image.

7. A microfilm searching and reading device for selecting a microfilm roll containing a target image from multiple microfilm rolls and for reading the target image to produce image data, comprising:

a storage rack having multiple support plates on which said microfilm rolls are stored, said support plates being arranged along the vertical direction one above another;

a pair of rotary shafts rotatably mounted on each support plate and having an upper end protruding above the upper surface of said support plate to engage with the center bore of the reel of said microfilm roll and a lower end protruding below the lower surface of said support plate to be fixedly connected to a driven disk;

a scanner facing said storage rack to move along the vertical direction and including an image reader and a driving unit for winding and rewinding the microfilm roll, said driving unit comprising drive rollers detachably engaging with said driven disks;

memory means for storing the positional data of respective microfilm rolls and the positional data of the image frame; and control means for producing instructions to allow said scanner to move the position facing said selected microfilm roll and to allow said image reader to read said target image.

8. A microfilm searching and reading device for selecting a microfilm containing a target image from multiple microfilms reels and for reading the target image to produce image data, comprising:
- a storage rack having multiple support plates on which microfilm reels are stored, said support plates being arranged along the vertical direction one above another;
- a pair of scanners disposed at the opposite sides of said storage rack and each facing said storage rack to move along the vertical direction and including an image reader and a driving unit for driving the selected microfilm reel to wind and rewind the microfilm;
- memory means for storing the positional data of respective microfilm reels; and
- control means for producing instructions to allow said scanner to move to the position facing said selected microfilm reel and to allow said image reader to read said target image.

9. The microfilm searching and reading device according to claim 8, wherein the image read by one scanner is the reverse of the image read by the other scanner, and wherein the image read by said one scanner is reversed by the image reader.

10. A microfilm searching and reading device for selecting a microfilm cartridge containing a target image from multiple microfilm cartridges and delivering the selected cartridge to a scanner where the target image is read by an image sensor to produce image data, characterized in that said scanner comprises:
- (a) a compartment defining a cavity receiving said selected microfilm cartridge;
- (b) a take-up a reel for taking up microfilm roll contained in said selected microfilm cartridge; and
- (c) an image reader disposed between said compartment and said take-up reel;
  said image reader including:
  - (i) a projection lens system disposed between said compartment and said take-up reel;
  - (ii) an image sensor disposed between said compartment and said take-up reel; and
  - (iii) a light source facing one surface of the microfilm roll opposite to the side at which said projection lens is positioned.

11. A microfilm searching and reading device for selecting a microfilm cartridge containing a target image from multiple microfilm cartridges and transferring the selected cartridge to a scanner where the target image is read by an image sensor to produce image data, characterized in that said scanner comprises an image reader which includes:
- a casing having at least one transparent wall facing the microfilm contained in said selected cartridge and sealingly containing therein a projection lens system and an image sensor; and
- a light source disposed outside of said casing and projecting said target image onto said image sensor through said transparent wall and said projection lens system.

12. An image reader comprising a light source, a projection lens system and an image sensor onto which the image of a microfilm is projected by said light source through said projection lens system, an improvement characterized in that said light source is an EL panel which is closely engaged with one surface of said microfilm during the image reading operation.

13. The image reader according to claim 12, wherein said EL panel has a controlled illuminance distribution which increases gradually from the center portion to the peripheral portion.

14. The image reader according to claim 12, wherein said projection lens system and said image sensor are contained in a sealed housing formed by a casing having at least one transparent wall, and wherein said light source is disposed outside of said casing and projects said image of the microfilm onto said image sensor through said transparent wall and said projection lens system.

15. An image reader comprising a light source, a projection lens system and an image sensor onto which the image of a microfilm is projected by said light source through said projection lens system, an improvement characterized in that said light source is an EL panel and said microfilm is closely sandwiched between said EL panel and a transparent plate facing to said EL panel.

16. The image reader according to claim 15, wherein said EL panel has a controlled illuminance distribution which increases gradually from the center portion to the peripheral portion.

17. A microfilm searching and reading device for selecting a microfilm cartridge containing a target image from multiple microfilm cartridges and for reading the target image to produce image data, comprising:
- a storage rack having multiple support plates on which said microfilm cartridges are stored, said support plates being arranged along the vertical direction one above another;
- a scanner facing said storage rack to move along the vertical direction and including an image reader and a driving unit for winding and rewinding the microfilm roll contained in said selected microfilm cartridge;
- a belt mechanism mounted on respective support plates for applying a biasing force to push out said selected microfilm cartridge so as to transfer said selected cartridge to said scanner;
- memory means for storing the positional data of respective microfilm cartridges; and
- control means for producing instructions to allow said scanner to move the position facing said selected microfilm cartridge and to allow said image reader to read said target image.

* * * * *

UNITED STATES PATENT AND TRADEMARK OFFICE
CERTIFICATE OF CORRECTION

PATENT NO. :      5,099,321
DATED       :      March 24, 1992
INVENTOR(S) :    Shunkichi Igarashi It is certified that error appears in the above-identified patent and that said Letters Patent is hereby corrected as shown below:

On the title page, add to the Foreign Application Priority Data section the following Japanese Patent Applications.

[30]       Foreign Application Priority Data

Mar. 18, 1988  [JP]   Japan ..................... 63-63485

Mar. 18, 1988  [JP]   Japan ..................... 63-63487

Apr. 28, 1988  [JP]   Japan ..................... 63-104190

Jun. 10, 1988  [JP]   Japan ..................... 63-141660

Jun. 10, 1988  [JP]   Japan ..................... 63-141661

Jun. 10, 1988  [JP]   Japan ..................... 63-141662

Jun. 10, 1988  [JP]   Japan ..................... 63-141663

UNITED STATES PATENT AND TRADEMARK OFFICE
CERTIFICATE OF CORRECTION

PATENT NO. :     5,099,321

DATED     :     March 24, 1992

INVENTOR(S) :   Shunkichi Igarashi

It is certified that error appears in the above-identified patent and that said Letters Patent is hereby corrected as shown below:

Aug. 19, 1988   [JP]    Japan .........................63-204743

Signed and Sealed this

Thirty-first Day of August, 1993

Attest:

Attesting Officer

BRUCE LEHMAN

Commissioner of Patents and Trademarks